United States Patent
Du et al.

(10) Patent No.: US 12,231,994 B2
(45) Date of Patent: Feb. 18, 2025

(54) SENSING METHOD AND COMMUNICATION APPARATUS

(71) Applicant: Huawei Technologies Co., Ltd., Shenzhen (CN)

(72) Inventors: Rui Du, Shenzhen (CN); Jian Yu, Shenzhen (CN); Xiao Han, Shenzhen (CN); Chenchen Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 423 days.

(21) Appl. No.: 17/665,809

(22) Filed: Feb. 7, 2022

(65) Prior Publication Data

US 2022/0159426 A1 May 19, 2022

Related U.S. Application Data

(63) Continuation of application No. PCT/CN2020/105860, filed on Jul. 30, 2020.

(30) Foreign Application Priority Data

Aug. 6, 2019 (CN) .......................... 201910722714.6

(51) Int. Cl.
*H04W 4/38* (2018.01)
*H04L 1/1607* (2023.01)

(52) U.S. Cl.
CPC ............. *H04W 4/38* (2018.02); *H04L 1/1607* (2013.01)

(58) Field of Classification Search
CPC .... H04L 5/0048; H04L 1/0083; H04B 7/0421
See application file for complete search history.

(56) References Cited

U.S. PATENT DOCUMENTS

2011/0026627 A1 2/2011 Chun et al.
2016/0337957 A1* 11/2016 Gonsalves .............. H04L 43/16
2018/0292518 A1* 10/2018 Chu .................... H04W 72/121
(Continued)

FOREIGN PATENT DOCUMENTS

CN 102361465 A 2/2012
CN 109218243 A 1/2019
(Continued)

OTHER PUBLICATIONS

"3rd Generation Partnership Project; Technical Specification Group Radio Access Network; Physical channels and mapping of transport channels onto physical channels (TDD) (Release 15)," 3GPP TS 25.221 V15.0.0, (Jun. 30, 2018), total 232 pages, 3rd Generation Partnership Project, Valbonne, France (Jun. 2018).
(Continued)

*Primary Examiner* — Harry H Kim
*Assistant Examiner* — Won Jun Choi
(74) *Attorney, Agent, or Firm* — Leydig, Voit & Mayer, Ltd.

(57) ABSTRACT

This application provides a sensing method and a communication apparatus. A first device indicates at least one second device to perform a sensing task by using a midamble, and indicates a sensing parameter required by the at least one second device to perform the sensing task. This may enable the at least one second device to perform the sensing task by using the midamble sent by the first device, to implement sensing by using the midamble.

20 Claims, 12 Drawing Sheets

(56) References Cited

U.S. PATENT DOCUMENTS

| | | | |
|---|---|---|---|
| 2019/0013978 A1 | 1/2019 | Zhou et al. | |
| 2019/0363843 A1* | 11/2019 | Gordaychik | H04L 1/08 |
| 2020/0112350 A1* | 4/2020 | Yang | H04B 7/0421 |
| 2022/0095347 A1* | 3/2022 | Huang | H04L 1/0047 |
| 2022/0231788 A1* | 7/2022 | Lim | H04W 4/40 |

FOREIGN PATENT DOCUMENTS

| | | |
|---|---|---|
| CN | 109428704 A | 3/2019 |
| WO | 2019009099 A1 | 1/2019 |

OTHER PUBLICATIONS

"P802.11az™/D1.0, Draft Standard for Information technology—Telecommunications and information exchange between systems Local and metropolitan area networks—Specific requirements, Part 11: Wireless LAN Medium Access Control (MAC) and Physical Layer (PHY) Specifications, Amendment 3: Enhancements for positioning," IEEE P802.11az™/D1.0, total 187 pages, Institute of Electrical and Electronics Engineers, New York, New York (Feb. 2019).

"Midamble Allocation and Channelisation Code Allocation Signalling to Support MIMO in UTRA TDD," 3GPP TSG RAN WG1#42, Tdoc R1-050934, London, United Kingdom, Total 7 pages, 3rd Generation Partnership Project, Valbonne, France (Aug. 29-Sep. 2, 2005).

\* cited by examiner

SENSING METHOD AND COMMUNICATION APPARATUS

CROSS-REFERENCE TO RELATED APPLICATIONS

This application is a continuation of International Application No. PCT/CN2020/105860, filed on Jul. 30, 2020, which claims priority to Chinese Patent Application No. 201910722714.6, filed on Aug. 6, 2019. The disclosures of the aforementioned applications are hereby incorporated by reference in their entireties.

TECHNICAL FIELD

Embodiments of this application relate to the communication field, and more specifically, to a sensing method and a communication apparatus.

BACKGROUND

Radar is mainly applied to non-contact object detection, and implements functions such as speed measurement, ranging, and imaging. When object detection is performed, an electromagnetic wave transmitted by a radar transmitter is received by a radar receiver after being reflected by an object. After the electromagnetic wave is received, a change of the transmitted wave and a target reflected wave is analyzed through a signal processing mean to obtain information such as a speed and a range of the object, or processing is performed on the object, for example, detection or imaging by using a related algorithm.

A radar technology is introduced into wireless fidelity (Wi-Fi) to implement integrated sensing and communication. This is a development trend of future communication. A conventional technology has not provided a specific solution to radar detection in a Wi-Fi system.

SUMMARY

This application provides a sensing method and a communication apparatus, to implement radar detection by using a midamble in a Wi-Fi system.

According to a first aspect, a sensing method is provided, including: A first device sends an announcement frame to at least one second device. The announcement frame is used to indicate the at least one second device to perform a sensing task by using a midamble, and to indicate a sensing parameter required by the at least one second device to perform the sensing task. The first device sends a physical layer protocol data unit (physical protocol data unit, PPDU) to the at least one second device. The PPDU includes at least one midamble.

According to a second aspect, a sensing method is provided, including: A second device receives an announcement frame sent by a first device. The announcement frame is used to indicate at least one second device including the second device to perform a sensing task by using a midamble, and to indicate a sensing parameter required by the at least one second device to perform the sensing task. The second device receives a physical layer protocol data unit sent by the first device. The physical layer protocol data unit includes at least one midamble. The second device performs the sensing task based on the announcement frame and the physical layer protocol data unit.

In the method provided in this application, based on an indication of the first device, the second device may perform the sensing task by using the midamble in the PPDU sent by the first device and the sensing parameter, to implement radar detection by using the midamble. In addition, the PPDU usually carries the midamble. In this way, radar detection can be implemented without a separate design of a detection process. This can reduce implementation complexity.

Further, a midamble signal has a simple sequence and a fixed period. Therefore, this can reduce sensing complexity and improve sensing efficiency. In addition, sensing precision can be improved because the midamble is sent on full bandwidth.

With reference to the first aspect or the second aspect, in some implementations, the announcement frame includes a type field and a subtype field. A value of the type field and a value of the subtype field jointly indicate the at least one second device to perform the sensing task.

It should be understood that "a value of an A field (or a subfield or a domain) represents B" or "a value of A indicates B" described in this application means that a meaning of the A field is B when the value of the A field is a specific value. A may be, for example, the announcement frame or the following sensing data frame.

With reference to the first aspect or the second aspect, in some implementations, the announcement frame includes a category field. A value of the category field indicates the at least one second device to perform the sensing task by using the midamble.

It should be understood that the second device may alternatively perform the sensing task by using a sequence of another type, for example, a pilot or a preamble. In this application, the second device performs the sensing task by using the midamble when the value of the category field is a specific value.

With reference to the first aspect or the second aspect, in some implementations, the announcement frame further includes a sensing task type field. The sensing task type field is used to indicate a type of the sensing task. The type of the sensing task includes target detection and action and behavior recognition. The target detection is used to determine at least one of a speed, a position, an angle, and a range of a target. The action and behavior recognition is used to recognize an action and/or a behavior of the target.

The second device may learn, based on the sensing task type field, a sensing task that needs to be performed.

With reference to the first aspect or the second aspect, in some implementations, the announcement frame includes a common information field and a user information field. When the sensing parameter of the at least one second device includes a same parameter, the same part of the sensing parameter is carried in the common information field. When the sensing parameter of the at least one second device includes a different part, the different part of the sensing parameter is carried in the user information field corresponding to each second device.

Specifically, the sensing parameter may be a collective term for parameters of a plurality of types. Each second device corresponds to the parameters of the plurality of types. A value of a parameter of a specific type may be carried in the common information field when the value of the parameter of the type corresponding to each second device (a parameter of a specific type in the sensing parameter) is the same. When a value of a parameter of a type corresponding to each second device is different, for example, there are four second devices in total, and values of parameters of a type corresponding to two second devices are different, then values of parameters of the type corresponding to the four second devices may be carried in user information fields corresponding to the four second devices.

Optionally, the sensing parameter of each of the at least one second device is the same when the sensing task is the action and behavior recognition. The first device configures a same sensing parameter for each second device. This helps the first device perform fusion recognition on a sensing result subsequently reported by the at least one second device.

Optionally, the corresponding sensing parameter may include a coherent processing interval (CPI) when the sensing task is the target detection. The CPI may be autonomously configured by the at least one second device. This can improve speed resolution for single-target detection, and improve multi-target detection accuracy for multi-target detection.

With reference to the first aspect, in some implementations, the method further includes: The first device sends feedback indication information to the at least one second device. The feedback indication information is used to indicate the at least one second device to feed back the sensing result obtained by performing the sensing task. The first device receives a sensing data frame reported by each of the at least one second device. The sensing data frame includes the sensing result.

Correspondingly, with reference to the second aspect, in some implementations, the method further includes: The second device receives feedback indication information sent by the first device. The feedback indication information is used to indicate the second device to feed back the sensing result obtained by performing the sensing task. The second device reports the sensing data frame to the first device. The sensing data frame includes the sensing result.

It should be understood that the first device may alternatively not send the feedback indication information, and the second device autonomously reports the sensing result after completing the sensing task.

With reference to the first aspect or the second aspect, in some implementations, the sensing data frame includes a category field. The category field indicates that the sensing result is obtained by using the midamble.

With reference to the first aspect or the second aspect, in some implementations, the sensing data frame includes a sensing data domain. The sensing data domain includes a sensing data control field and a sensing data field. The sensing data control field is used to indicate a type of data fed back by the second device. The sensing data field carries the data fed back by the second device. The sensing result includes the data fed back by the second device.

Based on a value of the sensing data control field, the first device may determine the type of the data fed back by the second device. For example, the first device may determine whether the second device feeds back a detection result obtained through the target detection, or feeds back a detection result obtained through the action and behavior recognition.

With reference to the first aspect, in some implementations, before the first device sends the announcement frame to the at least one second device, the method further includes: The first device receives a sensing request message sent by the at least one second device. A sensing request is used to request to perform the sensing task.

Correspondingly, with reference to the second aspect, in some implementations, before the second device receives the announcement frame sent by the first device, the method further includes: The second device sends the sensing request message to the first device. The sensing request is used to request to perform the sensing task.

According to a third aspect, a sensing method is provided, including: A first device sends a physical layer protocol data unit PPDU to at least one second device. The PPDU is used to indicate the at least one second device to perform a sensing task by using a midamble, and to indicate a sensing parameter required by the at least one second device to perform a sensing task. The PPDU includes at least one midamble.

According to a fourth aspect, a sensing method is provided, including: A second device receives a physical layer protocol data unit sent by the first device. The physical layer protocol data unit is used to indicate at least one second device to perform a sensing task by using a midamble, and to indicate a sensing parameter required by the at least one second device to perform the sensing task. The PPDU includes at least one midamble. The second device performs the sensing task based on the physical layer protocol data unit.

In the method provided in this application, the second device may perform the sensing task by using the midamble in the PPDU sent by the first device and the sensing parameter indicated by the PPDU, to implement radar detection by using the midamble. In addition, the PPDU usually carries the midamble. In this way, radar detection can be implemented without a separate design of a detection process. This can reduce implementation complexity.

Further, a midamble signal has a simple sequence and a fixed period. Therefore, this can reduce sensing complexity and improve sensing efficiency. In addition, sensing precision can be improved because the midamble is sent on full bandwidth.

With reference to the third aspect or the fourth aspect, in some implementations, a physical layer header of the PPDU is used to indicate the at least one second device to perform the sensing task by using the midamble, and to indicate the sensing parameter required by the at least one second device to perform the sensing task.

Optionally, a bit in a signal field A (signal A, SIG-A) may be reused to indicate the at least one second device to perform the sensing task by using the midamble, and to indicate the sensing parameter required by the at least one second device to perform the sensing task.

With reference to the third aspect or the fourth aspect, in some implementations, the physical layer header of the PPDU includes a sensing task type field. The sensing task type field is used to indicate a type of the sensing task. The type of the sensing task includes target detection and action and behavior recognition. The target detection is used to determine at least one of a speed, a position, an angle, and a range of a target. The action and behavior recognition is used to recognize an action and/or a behavior of the target.

With reference to the third aspect, in some implementations, the method further includes: The first device sends feedback indication information to the at least one second device. The feedback indication information is used to indicate the at least one second device to feed back a sensing result obtained by performing the sensing task. The first device receives a sensing data frame reported by each of the at least one second device. The sensing data frame includes the sensing result.

Correspondingly, with reference to the fourth aspect, in some implementations, the method further includes: The second device receives feedback indication information sent by the first device. The feedback indication information is used to indicate the at least one second device to feed back the sensing result obtained by performing the sensing task. The second device reports the sensing data frame to the first device. The sensing data frame includes the sensing result.

With reference to the third aspect or the fourth aspect, in some implementations, the sensing data frame includes a category field. The category field indicates that the sensing result is obtained by using the midamble.

It should be understood that the second device may alternatively perform the sensing task by using a sequence of another type, for example, a pilot or a preamble. In this application, the second device performs the sensing task by using the midamble when the value of the category field is a specific value.

With reference to the third aspect or the fourth aspect, in some implementations, the sensing data frame includes a feedback type indication field. The feedback type indication field is used to indicate that the sensing result is sensing data.

With reference to the third aspect or the fourth aspect, in some implementations, the sensing data frame includes a sensing data domain. The sensing data domain includes a sensing data control field and a sensing data field. The sensing data control field is used to indicate a type of data fed back by the second device. The sensing data field carries the data fed back by the second device. The sensing result includes the data fed back by the second device.

Optionally, the sensing parameter of each of the at least one second device is the same when the sensing task is the action and behavior recognition. The first device configures a same sensing parameter for each second device. This helps the first device perform fusion recognition on the sensing result subsequently reported by the at least one second device.

Optionally, the corresponding sensing parameter may include a coherent processing interval (CPI) when the sensing task is the target detection. The CPI may be autonomously configured by the at least one second device. This can improve speed resolution for single-target detection, and improve multi-target detection accuracy for multi-target detection.

With reference to the third aspect, in some implementations, before the first device sends the PPDU to the at least one second device, the method further includes: The first device receives a sensing request message sent by the at least one second device. A sensing request is used to request to perform the sensing task.

Correspondingly, with reference to the fourth aspect, in some implementations, before the second device receives the PPDU sent by the first device, the method further includes: The second device sends the sensing request message to the first device. The sensing request is used to request to perform the sensing task.

According to a fifth aspect, a communication apparatus is provided, including a processor. The processor is coupled to a memory, and may be configured to execute instructions in the memory, to implement the method according to any one of the first aspect or the third aspect and the possible implementations of the first aspect or the third aspect. Optionally, the communication apparatus further includes the memory. Optionally, the communication apparatus further includes a communication interface, and the processor is coupled to the communication interface.

According to a sixth aspect, a communication apparatus is provided, including a processor. The processor is coupled to a memory, and may be configured to execute instructions in the memory, to implement the method according to any one of the second aspect or the fourth aspect and the possible implementations of the second aspect or the fourth aspect.

Optionally, the communication apparatus further includes the memory. Optionally, the communication apparatus further includes a communication interface, and the processor is coupled to the communication interface.

According to a seventh aspect, a processor is provided, including an input circuit, an output circuit, and a processing circuit. The processing circuit is configured to: receive a signal through the input circuit and transmit a signal through the output circuit, to enable the processor to perform the method according to any one of the first aspect to the fourth aspect and the possible implementations of the first aspect to the fourth aspect.

In a specific implementation process, the processor may be one or more chips, the input circuit may be an input pin, the output circuit may be an output pin, and the processing circuit may be a transistor, a gate circuit, a trigger, various logic circuits, or the like. An input signal received by the input circuit may be received and input by, for example, but not limited to, a receiver, a signal output by the output circuit may be output to, for example, but not limited to, a transmitter and transmitted by the transmitter, and the input circuit and the output circuit may be a same circuit, where the circuit is used as the input circuit and the output circuit at different moments. Specific implementations of the processor and the circuits are not limited in this embodiment of this application.

According to an eighth aspect, a processing apparatus is provided, including a processor and a memory. The processor is configured to: read instructions stored in the memory, receive a signal through a receiver, and transmit a signal through a transmitter, to perform the method according to any one of the first aspect to the fourth aspect and the possible implementations of the first aspect to the fourth aspect.

Optionally, there are one or more processors, and there are one or more memories. Optionally, the memory may be integrated with the processor, or the memory and the processor are separately disposed.

In a specific implementation process, the memory may be a non-transitory memory, for example, a read-only memory (ROM). The memory and the processor may be integrated on a same chip, or may be separately disposed on different chips. A type of the memory and a manner of disposing the memory and the processor are not limited in this embodiment of this application.

It should be understood that, a related data exchange process such as sending indication information may be a process of outputting the indication information from the processor, and receiving capability information may be a process of receiving the input capability information by the processor. Specifically, data output by the processor may be output to the transmitter, and input data received by the processor may be from the receiver. The transmitter and the receiver may be collectively referred to as a transceiver.

The processing apparatus in the eighth aspect may be one or more chips. The processor in the processing apparatus may be implemented by hardware, or may be implemented by software. When the processor is implemented by hardware, the processor may be a logic circuit, an integrated circuit, or the like. When the processor is implemented by software, the processor may be a general-purpose processor, and is implemented by reading software code stored in the memory. The memory may be integrated into the processor, or may be located outside the processor and exist independently.

According to a ninth aspect, a computer program product is provided. The computer program product includes a computer program (which may also be referred to as code or an instruction). When the computer program is run, a computer is enabled to perform the method according to any one of the first aspect to the fourth aspect and the possible implementations of the first aspect to the fourth aspect.

According to a tenth aspect, a computer-readable medium is provided. The computer-readable medium stores a computer program (which may also be referred to as code or an instruction). When the computer program is run on a computer, the computer is enabled to perform the method according to any one of the first aspect to the fourth aspect and the possible implementations of the first aspect to the fourth aspect.

According to an eleventh aspect, a communication system is provided, including the foregoing first device and the second device.

According to a twelfth aspect, an apparatus is provided, configured to perform the method according to any one of the first aspect to the fourth aspect and the possible implementations of the first aspect to the fourth aspect.

DESCRIPTION OF EMBODIMENTS

Figure 1:
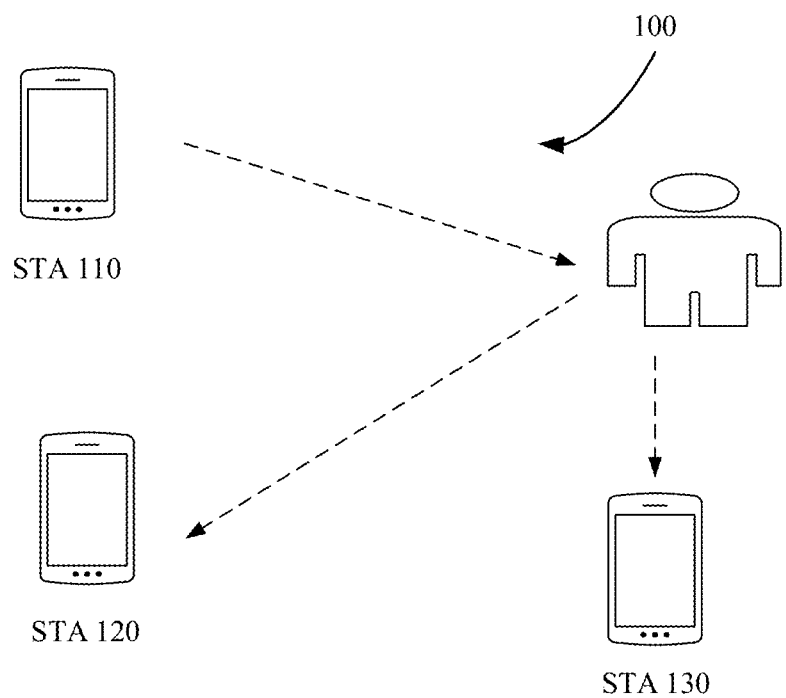
FIG. 1 is a block diagram of a system that may be applied to this application.

The following describes technical solutions of this application with reference to accompanying drawings.

The technical solutions in the embodiments of this application may be applied to a Wi-Fi system. The Wi-Fi system may access a plurality of cellular systems, for example, a long term evolution (LTE) system, an LTE frequency division duplex (FDD) system, an LTE time division duplex (TDD) system, a universal mobile telecommunications system (UMTS), a worldwide interoperability for microwave access (WiMAX) communication system, a fifth generation ($5^{th}$ generation, 5G) system, or a new radio (NR) system.

An access point (AP) in this application is a communication apparatus that has a wireless transceiver function and provides a service for a station, and is also referred to as a wireless access point, a hotspot, or the like. The AP is an access point used by a mobile user to access a wired network, and is mainly deployed in a home, inside a building, and inside a campus, with a typical coverage radius of tens of meters to hundreds of meters. Certainly, the AP may alternatively be deployed outdoors. The AP is equivalent to a bridge that connects a wired network and a wireless network. A main function of the AP is to connect wireless network clients together, and then connect the wireless network to the Ethernet.

A station (STA) in this application is a communication apparatus having a wireless communication function, and may be a wireless communication chip, a wireless sensor, or a wireless communication terminal. The station is, for example, a mobile phone supporting a Wi-Fi communication function, a tablet computer supporting a Wi-Fi communication function, a set top box supporting a Wi-Fi communication function, a smart television supporting a Wi-Fi communication function, an intelligent wearable device supporting a Wi-Fi communication function, an in-vehicle communication device supporting a Wi-Fi communication function, a computer supporting a Wi-Fi communication function, and an internet of things node in the internet of things supporting a Wi-Fi communication function.

In this embodiment of this application, the AP or the STA includes a hardware layer, an operating system layer that runs on the hardware layer, and an application layer that runs on the operating system layer. The hardware layer includes hardware such as a central processing unit (CPU), a memory management unit (MMU), and a memory (also referred to as a main memory). The operating system may be any one or more computer operating systems that implement service processing through a process, for example, a Linux operating system, a Unix operating system, an Android operating system, an iOS operating system, or a windows operating system. The application layer includes applications such as a browser, an address book, word processing software, and instant messaging software. In addition, a specific structure of an execution body of the method provided in the embodiments of this application is not specially limited in the embodiments of this application, provided that a program that records code of the method provided in the embodiments of this application can be run to perform communication according to the method provided in the embodiments of this application. For example, the method provided in the embodiments of this application may be performed by the AP or the STA, or a functional module that can invoke and execute the program in the AP or the STA.

In addition, each aspect or feature of this application may be implemented as a method, an apparatus or a product that uses standard programming and/or engineering technologies. The term "product" used in this application covers a computer program that can be accessed from any computer-readable component, carrier or medium.

FIG. 1 is a block diagram of a system that may be applied to this application. As shown in FIG. 1, the system 100 may include at least two stations (STAs), for example, a STA 110 and a STA 120. The STA 110 may transmit a Wi-Fi signal, and the Wi-Fi signal arrives at the STA 120 after being reflected by a human body (or another passive object). The STA 120 may perform sensing by using the Wi-Fi signal to implement radar detection. It should be understood that the system 100 may further include more STAs, for example, a STA 130. The Wi-Fi signal transmitted by the STA 110 may also arrive at the STA 130 after being reflected by a human body. The STA 130 may perform sensing together with the STA 120 to improve detection precision. In addition, the system 100 may further include an AP. However, this is not limited in this application.

Figure 2:
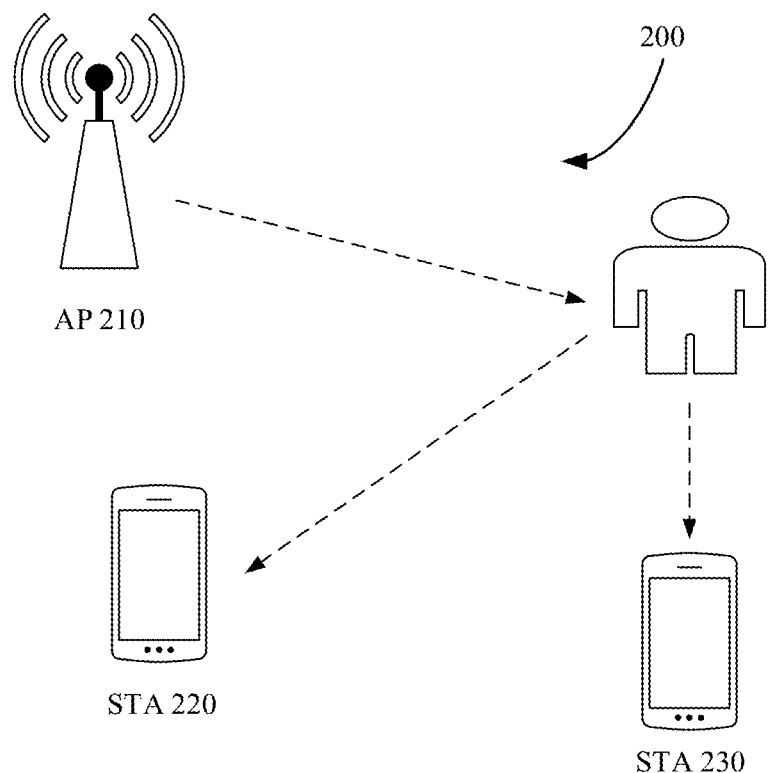
FIG. 2 is a block diagram of another system that may be applied to this application.

FIG. 2 is a block diagram of another system that may be applied to this application. As shown in FIG. 2, the system 200 may include at least one STA and at least one access point (AP), for example, an AP 210 and a STA 220. The AP 210 may transmit a Wi-Fi signal, and the Wi-Fi signal arrives at the STA 220 after being reflected by a human body (or another passive object). The STA 220 may perform sensing by using the Wi-Fi signal to implement radar detection. It should be understood that the system 200 may further include another STA, for example, a STA 230. The Wi-Fi signal transmitted by the AP 210 may also arrive at the STA 230 after being reflected by a human body. The STA 230 may perform sensing together with the STA 220 to improve detection precision.

Alternatively, the STA 220 may transmit a Wi-Fi signal, and the AP 220 performs sensing by using the reflected Wi-Fi signal in the system shown in FIG. 2. It should be understood that, in this case, the system may further include another AP, and the AP may perform sensing together with the AP 220.

The solutions provided in this application are described in detail below:

It should be noted that, in this application, a first device may be an AP, a chip in the AP, or a functional module in the AP (collectively referred to as the AP below), and a second device is correspondingly a STA, a chip in the STA, or a functional module in the STA (collectively referred to as the STA below). Alternatively, the first device may be a STA, and the second device is correspondingly a STA different from the first device. Alternatively, the first device may be a STA, and the second device is correspondingly an AP.

Figure 3:
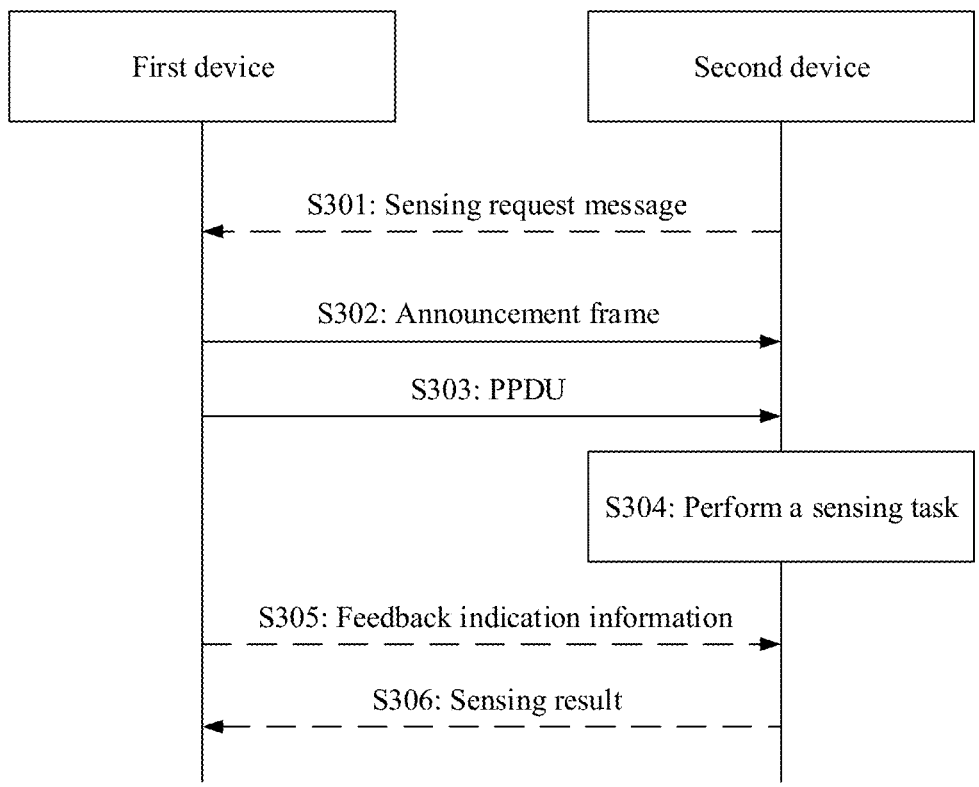
FIG. 3 is a schematic flowchart of a sensing method according to this application.

FIG. 3 is a schematic flowchart of a sensing method according to this application. As shown in FIG. 3, the method 300 may include S302 to S304. Optionally, the method 300 may further include S301, S305, and S306.

S301: A second device sends a sensing request message to a first device. Correspondingly, the first device receives the sensing request message, where a sensing request is used to request to perform a sensing task.

S302: The first device sends an announcement frame to at least one second device. Correspondingly, the second device receives the announcement frame.

The announcement frame is used to indicate the at least one second device to perform the sensing task by using a sensing signal, and to indicate a sensing parameter required by the at least one second device to perform the sensing task.

S303: The first device sends a PPDU to the at least one second device, where the PPDU includes the sensing signal. Correspondingly, the second device receives the PPDU.

S304: The second device performs the sensing task by using the sensing signal and the sensing parameter.

S305: The first device sends feedback indication information to the at least one second device. Correspondingly, the second device receives the feedback indication information, where the feedback indication information is used to indicate the at least one second device to feed back a sensing result obtained by performing the sensing task.

S306: The second device reports a sensing data frame to the first device. Correspondingly, the first device receives the sensing data frame reported by the at least one second device, where the sensing data frame includes the sensing result.

In the method provided in this application, based on an indication of the first device, the second device may perform the sensing task by using the sensing signal in the PPDU sent by the first device and the sensing parameter, to implement radar detection by using a Wi-Fi signal. In addition, the PPDU usually carries the sensing signal. In this way, radar detection can be implemented without a separate design of a detection process. This can reduce implementation complexity.

Further, the sensing signal may be a midamble. A midamble signal has a simple sequence and a fixed period. Therefore, this can reduce sensing complexity and improve sensing efficiency. In addition, sensing precision can be improved because the midamble is sent on full bandwidth.

The method 300 is described in detail below with reference to the steps.

S301 is an optional step. It should be understood that the first device may send an announcement to the second device based on a request of the second device. For example, the at least one second device in S302 may be some or all of the second devices that send the sensing request message to the first device. Alternatively, the first device may autonomously send the announcement frame to the at least one second device. In other words, the first device may send the announcement frame not based on the request of the second device. For example, even if a second device requests to perform the sensing task, the at least one second device in S302 may not be the second device that sends the sensing request message. For another example, the first device may send the announcement frame to the at least one second device when no second device requests to perform the sensing task.

In S302, the announcement frame is used to indicate the at least one second device to perform the sensing task by using the sensing signal. After receiving the announcement frame, the second device may determine that the second device needs to perform the sensing task by using the sensing signal. Optionally, the announcement frame may further indicate a type of the sensing signal. To be specific, the announcement frame may indicate the at least one second device to perform the sensing task by using a sensing signal. For example, the sensing signal may include three types: a midamble, a pilot, and a preamble. Correspondingly, based on an indication of the announcement frame, the second device may perform the sensing task by using one or more signals of the midamble, the pilot, and the preamble. It should be noted that the announcement frame may not indicate the type of the sensing signal. In this case, the type of the sensing signal may be specified in a protocol, or may be negotiated by the first device and the at least one second device in advance. For example, the protocol may specify that a device in a Wi-Fi system can perform the sensing task only by using the midamble.

In addition, the announcement frame is further used to indicate the sensing parameter required by the at least one second device to perform the sensing task.

With reference to different application scenarios, the following describes how the announcement frame indicates the sensing parameter required by the at least one second device to perform the sensing task.

Scenario 1

The first device determines a type of the sensing task performed by the second device.

The sensing parameter corresponds to the type of the sensing task. A sensing parameter corresponding to a sensing task of any type may include a plurality of parameters. For example, a sensing task of a specific type may include parameters of three different types (also referred to as categories): an A parameter, a B parameter, and a C parameter. Sensing parameters corresponding to sensing tasks of different types may include parameters of different types. However, this is not limited in this application. For example, a sensing task of one type may include the A parameter, the B parameter, and the C parameter, and a sensing task of another type may include the A parameter, the B parameter, and a D parameter. In this application, the first device and the second device may negotiate in advance, or a protocol may specify which parameters (namely, parameters of which types) are included in a sensing parameter corresponding to a sensing task of each type. In other words, the first device and the second device have a same understanding of the sensing parameter corresponding to the sensing task of each type.

For example, the sensing tasks in this application may be classified into two types: target detection and action and behavior recognition.

The target detection refers to detecting one or more pieces of information of a position, a range, a speed, and an angle of a target. For example, the sensing parameter may include a sensing frequency, a start time, an end time, a sensing period, and a coherent processing interval (CPI) when the sensing task is the target detection.

The action and behavior recognition refers to recognizing an action and/or a behavior of the target. For example, the sensing parameter may include one or a combination of the following: the sensing frequency, the start time, the end time, the sensing period, the CPI and a time-frequency processing parameter (for example, a short-time Fourier transform window length or a sliding window overlap) when the sensing task is the action and behavior recognition.

The sensing frequency is a sending frequency of the sensing signal.

The start time is a start time at which the second device performs the sensing task. For example, the start time is 10 ms later, indicating that the second device starts to perform the foregoing sensing processing on the midamble after 10 ms.

The end time is an end time at which the second device performs the sensing task.

The sensing period is a period in which the second device performs the sensing task. For example, the sensing period is 2 minutes, indicating that the second device performs the sensing task every 2 minutes.

In the scenario 1, the announcement frame may indicate the sensing parameter according to the following four rules. Details are described below:

Rule 1

If the first device needs to indicate the second device to perform a sensing task of a specific type, the first device needs to send, to the second device, a sensing parameter corresponding to the sensing task of the type.

In this case, in this application, the first device may include, in the announcement frame based on the type of the sensing task that needs to be performed by the at least one second device, the sensing parameter corresponding to the sensing task (or the type of the sensing task) for each second device. For example, the first device includes, in the announcement frame, the sensing frequency, the start time, the end time, the sensing period, and the CPI for each second device when the first device requires the at least one second device to perform the target detection. For example, the first device includes, in the announcement frame, the sensing frequency, the start time, the end time, the sensing period, the CPI, and the time-frequency processing parameter for each second device when the first device requires the at least one second device to perform the action and behavior recognition.

It may be understood that the first device and the second device have the same understanding of the sensing parameter corresponding to the sensing task of each type in this manner. In this way, the second device may determine, based on the sensing parameter included by the first device, the type of the sensing task that needs to be performed by the second device.

It should be noted that, if the sensing parameter of each of the at least one second device is the same, the first device may include only one sensing parameter in the announcement frame, and the sensing parameter is shared by the at least one second device. It should be understood that the same sensing parameter herein means that a value of a parameter of a same type in the sensing parameter is the same for different second devices. For example, if the sensing parameter corresponding to the sensing task determined by the first device is the A parameter, the B parameter, and the C parameter, then for each second device, a value of the A parameter is the same, a value of the B parameter is the same, and a value of the C parameter is also the same.

Optionally, the sensing parameter of each of the at least one second device is the same when the sensing task is the action and behavior recognition. The first device configures a same sensing parameter for each second device. This helps the first device perform fusion recognition on the sensing result subsequently reported by the at least one second device.

Rule 2

If the first device needs to indicate the second device to perform the target detection, the first device needs to send, to the second device, a part of a sensing parameter corresponding to the target detection. In addition, the second device needs to set autonomously the remaining part of the sensing parameter. Alternatively, the second device sets the remaining part of the sensing parameter according to the protocol specification. Alternatively, the second device sets the remaining part of the sensing parameter based on the negotiation with the first device in advance. If the second device needs to indicate the second device to perform the action and behavior recognition, the first device needs to send, to the second device, the sensing parameter (namely, the part of the sensing parameter) corresponding to the target detection.

In this way, in this application, if determining that the second device needs to perform target detection, the first device may include, in the announcement frame, the part of the sensing parameter corresponding to the target detection for each second device. The remaining part that is of the sensing parameter corresponding to the target detection and that is not carried in the announcement frame is set autonomously by each second device, specified in the protocol, or negotiated by the first device and each second device in advance. If determining that the second device needs to perform the action and behavior recognition, the first device may include, in the announcement frame, the sensing parameter corresponding to the action and behavior recognition for each second device.

If the announcement frame received by the second device carries the part of the sensing parameter corresponding to the target detection, the second device may determine that the target detection task needs to be performed. In addition, the second device may determine, through autonomously setting or negotiation with the first device in advance, or based on the protocol specification, the remaining part that is of the sensing parameter corresponding to the target detection and that is not carried in the announcement frame. If the announcement frame received by the second device carries the sensing parameter corresponding to the action and behavior recognition, the second device may determine that the action and behavior recognition needs to be performed.

It should be noted that some or all of the foregoing part of parameters of the at least one second device may be the same or may be different. This is not limited in this application. In addition, the announcement frame may carry only one same part of the foregoing part of parameters of the at least one second device. However, this is not limited in this application.

For example, the sensing parameter corresponding to the target detection is: the sensing frequency, the start time, the end time, the sensing period, and the CPI. The sensing period may be carried in the announcement frame. The CPI may be determined by the second device.

In this application, when the sensing task is the target detection, if the second device autonomously configures the CPI, speed resolution for single-target detection may be improved, and multi-target detection accuracy for multi-target detection may be improved.

Rule 3

If the first device needs to indicate the second device to perform a sensing task of a specific type, the first device needs to send, to the second device, the type of the sensing task and a part of a sensing parameter corresponding to the sensing task of the type. The remaining part that is of the sensing parameter corresponding to the sensing task and that is not carried in the announcement frame is set autonomously by each second device, specified in the protocol, or negotiated by the first device and each second device in advance.

In this way, the first device may include, in the announcement frame, the type of the sensing task and the part of the sensing parameter corresponding to the sensing task in this application. The second device may determine, based on the type of the sensing task carried in the announcement frame, the type of the sensing task that needs to be performed. In addition, the second device may determine, through autonomously setting or negotiation with the first device in advance, or based on the protocol specification, the remaining part that is of the sensing parameter corresponding to the sensing task that needs to be performed and that is not carried in the announcement frame.

Rule 4

If the first device needs to indicate the second device to perform a sensing task of a specific type, the first device needs to send the type of the sensing task to the second device. In addition, a sensing parameter corresponding to the sensing task is set autonomously by each second device, specified in the protocol, or negotiated by the first device and each second device in advance.

In this way, in this application, the first device may include the type of the sensing task in the announcement frame. The second device may determine, based on the type of the sensing task carried in the announcement frame, the type of the sensing task that needs to be performed. In addition, based on the type of the sensing task that needs to be performed, the second device may determine, through autonomously setting or negotiation with the first device in advance, or based on the protocol specification, the sensing parameter corresponding to the sensing task that needs to be performed.

Optionally, the announcement frame may further carry the type of the sensing task in the manner 1 and manner 2.

Optionally, the type of the sensing task may be carried in a sensing task type field in the announcement frame.

Scenario 2

Through protocol specification or negotiation by the first device and the second device in advance, the second device performs only a sensing task of a specific type, or performs sensing tasks of a plurality of types simultaneously.

In the scenario 2, the announcement frame may indicate the sensing parameter according to the following two rules. Details are described below.

Rule 1

The first device needs to send, to the second device, a part or all of a sensing parameter corresponding to a sensing task of each type that the second device needs to perform.

In this application, the first device may include, in the announcement frame, the part or all of the sensing parameter corresponding to the sensing task of each type that the second device needs to perform. When the announcement frame carries only a part of a sensing parameter corresponding to a sensing task of a specific type, the second device may determine, through autonomously setting or negotiation with the first device in advance, or based on the protocol specification, the remaining part of the sensing parameter corresponding to the sensing task of the type.

Rule 2

The first device only indicates the second device to perform a sensing task, and the second device may determine a sensing parameter through autonomously setting or negotiation with the first device in advance, or based on the protocol specification.

In conclusion, the second device may determine, based on the announcement frame sent by the first device, the sensing parameter required to perform the sensing task.

A person skilled in the art may understand that the first device may include the sensing parameter in the announcement frame in some manners described above. In this way, the first device can flexibly configure the sensing parameter. The sensing parameter may be specified in the protocol in other manners. This can avoid signaling overheads caused by configuring the sensing parameter by the first device.

For ease of understanding, the following mainly uses an example in which the sensing signal is the midamble for description of S303 and S304. It should be understood that one PPDU may include one or more midambles.

A quantity of the midambles in one PPDU may be less than the CPI. In this case, S302 and S303 are repeatedly performed. Specifically, the first device may send the PPDU after sending the announcement frame. In S304, the second device may perform signal processing, for example, multipath cancellation and matched filtering on the midamble in the PPDU, and perform accumulation based on a CPI length. Then, the first device sends the PPDU again, and the second device performs signal processing, for example, multipath cancellation and matched filtering on the midamble in the PPDU, and performs accumulation based on the CPI length. This process is repeated until the second device completes the accumulation, and may feed back the sensing result.

Figure 4:
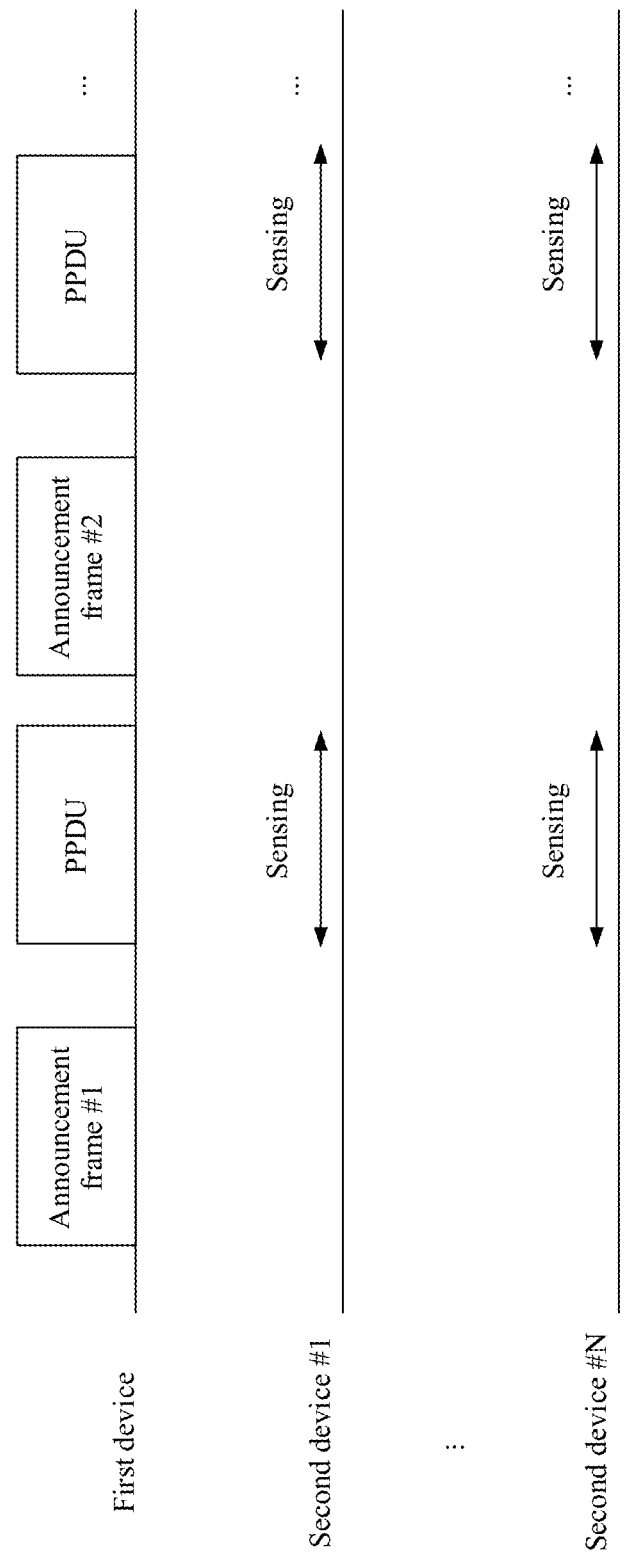
FIG. 4 is a schematic diagram of a sensing method according to this application.

In S303, for example, when the first device has sufficient to-be-sent services, the first device may continuously send the ordinary PPDU, and the second device performs sensing by using the midamble in the PPDU. For example, as shown in FIG. 4, the first device sends an announcement frame #1 and then sends the PPDU, and the at least one second device (such as a second device #1 to a second device #N as shown in FIG. 4) performs sensing based on the PPDU. Then, the first device sends an announcement frame #2 and sends the PPDU again, and the at least one second device performs sensing based on the PPDU. This is repeated until the second device completes the sensing task.

Figure 5:
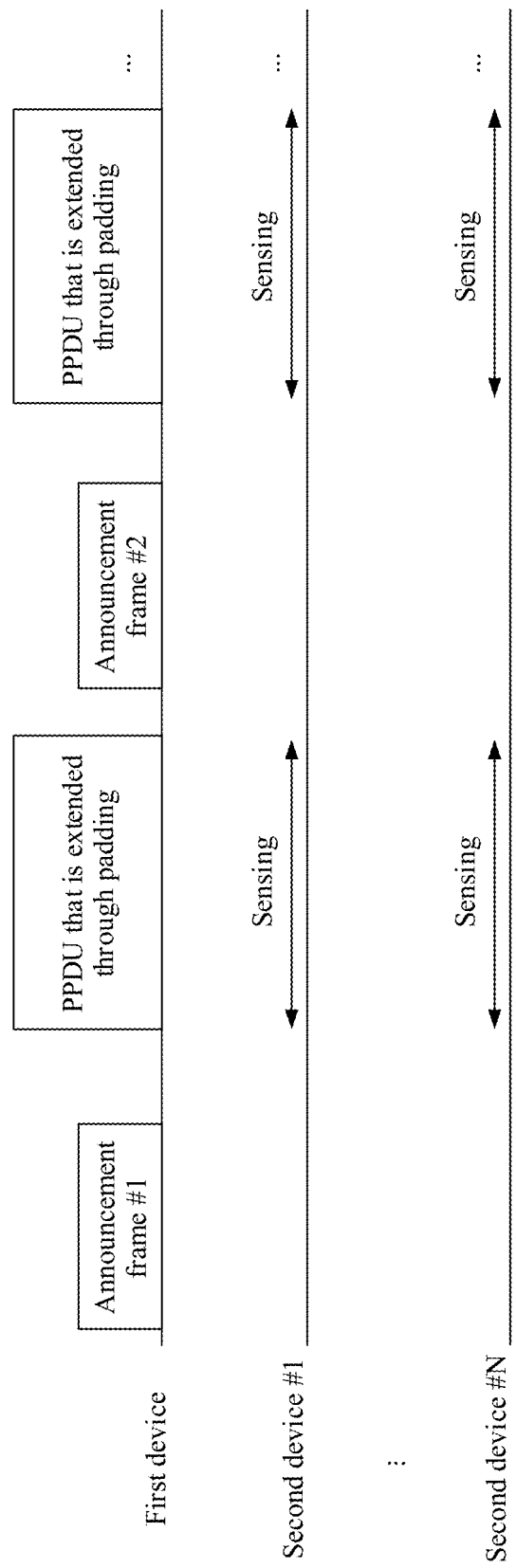
FIG. 5 is a schematic diagram of another sensing method according to this application.

For example, when the first device has insufficient to-be-sent services, the PPDU may be extended through padding by the first device, to increase the quantity of the midambles that can be used by the second device. This ensures sensing performance. For example, as shown in FIG. 5, the first device sends an announcement frame #1 and then sends a PPDU that is extended through padding, and the at least one second device (such as a second device #1 to a second device #N as shown in FIG. 5) performs sensing based on the PPDU that is extended through padding. Then, the first device sends an announcement frame #2 and sends the PPDU that is extended through padding again, and the at least one second device performs sensing based on the PPDU that is extended through padding. This is repeated until the second device completes the sensing task.

Figure 6:
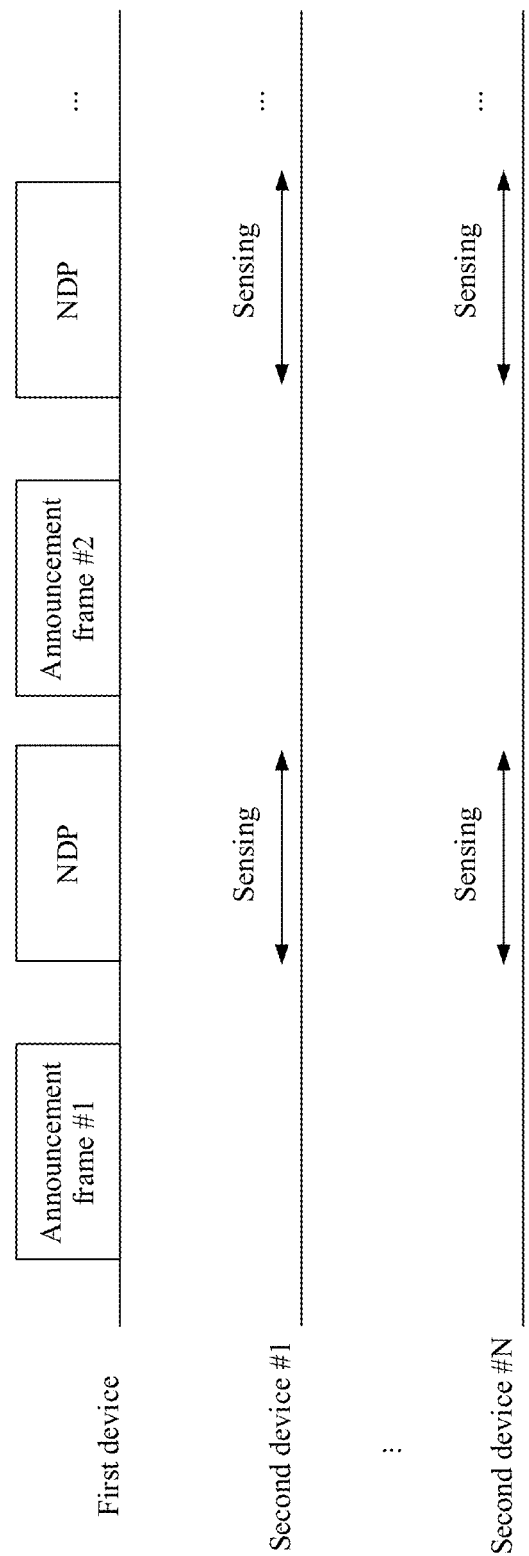
FIG. 6 is a schematic diagram of a sensing method according to this application.

In addition, when the first device has the insufficient to-be-sent services, the first device may alternatively send a null data packet (NDP). A part of a sequence (namely, a long training field (LTF)) of a preamble in the null data packet is the same as a sequence of the midamble. This is equivalent to that null data includes the midamble. The quantity of the midambles that can be used by the second device can be increased by sending the null data packet. This ensures sensing performance. For example, as shown in FIG. 6, the first device sends an announcement frame #1 and then sends the NDP, and the at least one second device (such as a second device #1 to a second device #N as shown in FIG. 6) performs sensing based on the NDP. Then, the first device sends an announcement frame #2 and sends the NDP again, and the at least one second device performs sensing based on the PPDU that is extended through padding. This is repeated until the second device completes the sensing task.

The feedback indication information in S305 may be a feedback trigger frame.

Optionally, the feedback indication information may further indicate a type of data that the second device needs to feed back. For example, the second device needs to feed back a result obtained by performing the target detection, or needs to feed back a result obtained by performing the action and behavior recognition.

In S306, the second device needs to report the sensing result (namely, radar test data) to the first device after completing the sensing task. The first device may combine the sensing result reported by the at least one second device, to obtain a detection result, for example, a position of the target, or an action or behavior of the target.

Optionally, a sensing result corresponding to the target detection may include one or more pieces of information of a speed, a range, a position, and an angle.

Optionally, a sensing result corresponding to the action and behavior recognition may include information, for example, range-Doppler and/or time-Doppler. Based on the information, for example, the range-Doppler and/or time-Doppler, the first device may determine the action and/or behavior of the to-be-detected target, for example, walking, falling, waving an arm, breathing, or heart beating.

For example, in this application, the second device may report the sensing result to the first device in the following manners:

1. The second device sends a feedback trigger frame, where the feedback indication information is the feedback trigger frame, and the second device reports the sensing result after receiving the feedback trigger frame.

Figure 7:
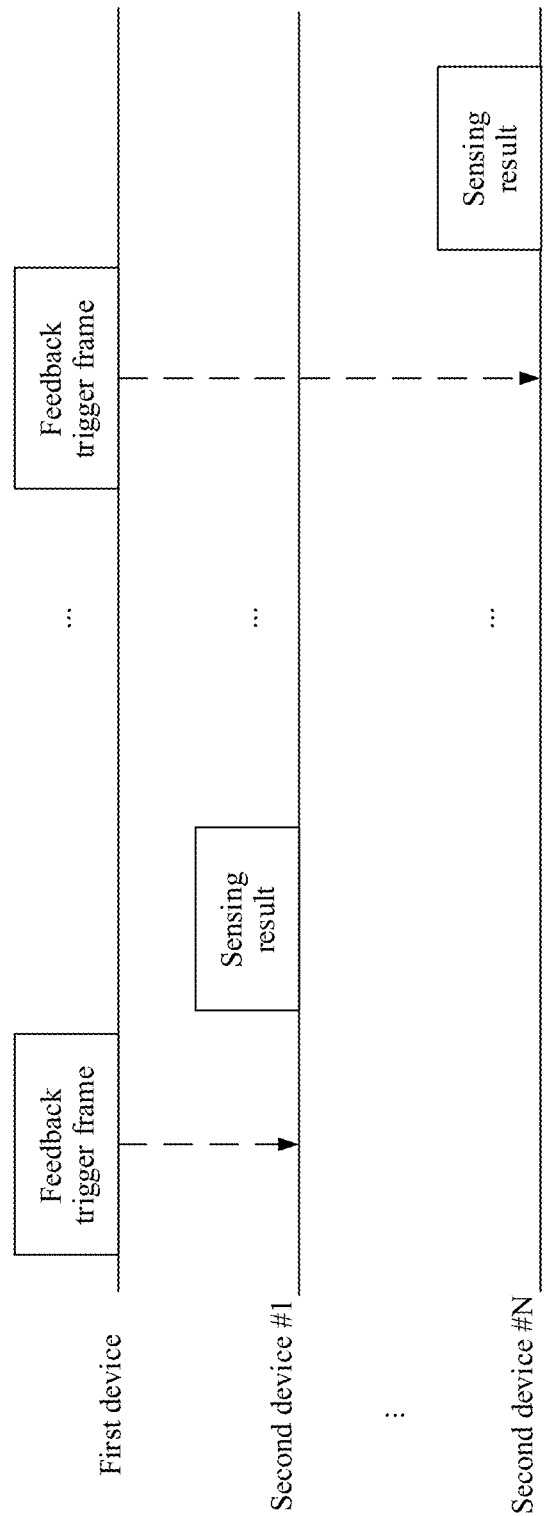
FIG. 7 is a schematic diagram of feeding back a sensing result according to this application.

One feedback trigger frame can trigger only one second device to report the sensing result. In this case, the first device may send the feedback trigger frame to each second device in a specific order, and any second device reports the sensing result after receiving the feedback trigger frame corresponding to the second device. In other words, the at least one second device may report the sensing result by time. For example, as shown in FIG. 7, the second device sequentially sends a trigger frame to a second device #1 to a second device #N, to trigger the second device #1 to the second device #N to sequentially feed back a sensing result.

Figure 8:
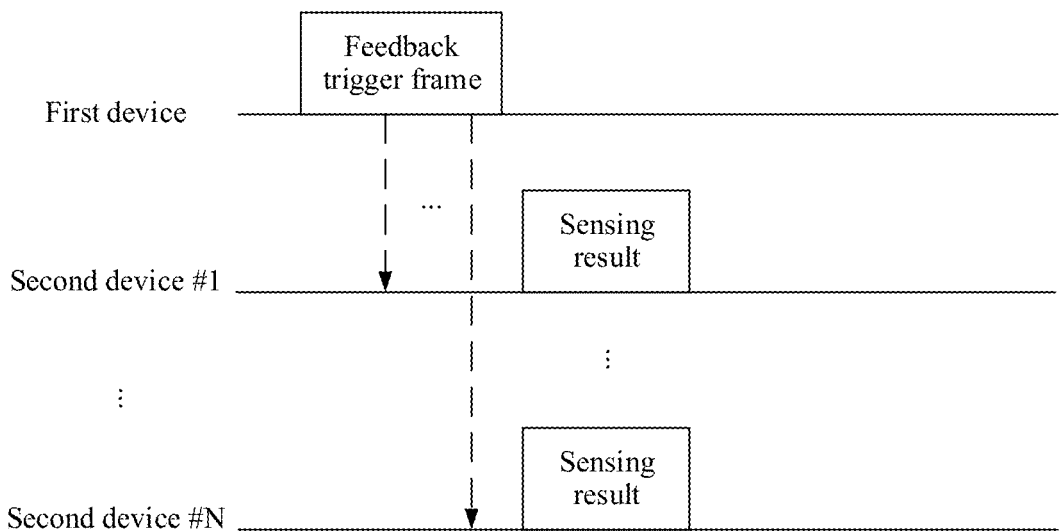
FIG. 8 is another schematic diagram of feeding back a sensing result according to this application.

One feedback trigger frame can alternatively trigger a plurality of second devices to report sensing results. In this case, after receiving the feedback trigger frame, the at least one second device may report the sensing results in a multiple-input multiple-output (MIMO) or orthogonal frequency division multiple access (OFDMA) manner, in an order specified by the feedback trigger frame, or in another possible manner. For example, as shown in FIG. 8, the first device may send one feedback trigger frame, and a second device #1 to a second device #N may feed back the sensing results in the OFDMA manner.

2. The first device sends a poll frame, where the feedback indication information is the poll frame, and the second device performs a report based on the received poll frame.

Figure 9:
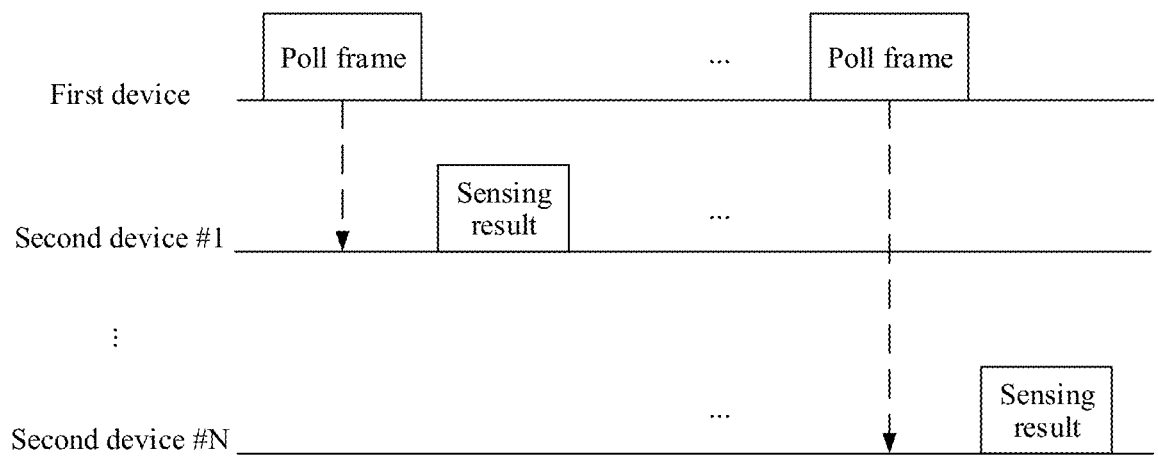
FIG. 9 is still another schematic diagram of feeding back a sensing result according to this application.

Specifically, the first device may send the poll frame to each second device in a specific order, and the second device that receives the poll frame may report the sensing result. For example, as shown in FIG. 9, the second device sequentially sends the poll frame to a second device #1 to a second device #N, to trigger the second device #1 to the second device #N to sequentially feed back the sensing result.

It should be noted that the second device may also autonomously report the sensing result after performing the sensing task to obtain the sensing result. In other words, the second device may report the sensing result without the trigger of the feedback indication information.

The steps in the method 300 are described above. The following describes with examples possible structures of the three frames mentioned in the foregoing method: the announcement frame in S302, the feedback trigger frame (a possible form of the feedback indication information) in S305, and the sensing data frame in S306.

1. Announcement Frame

Figure 10:
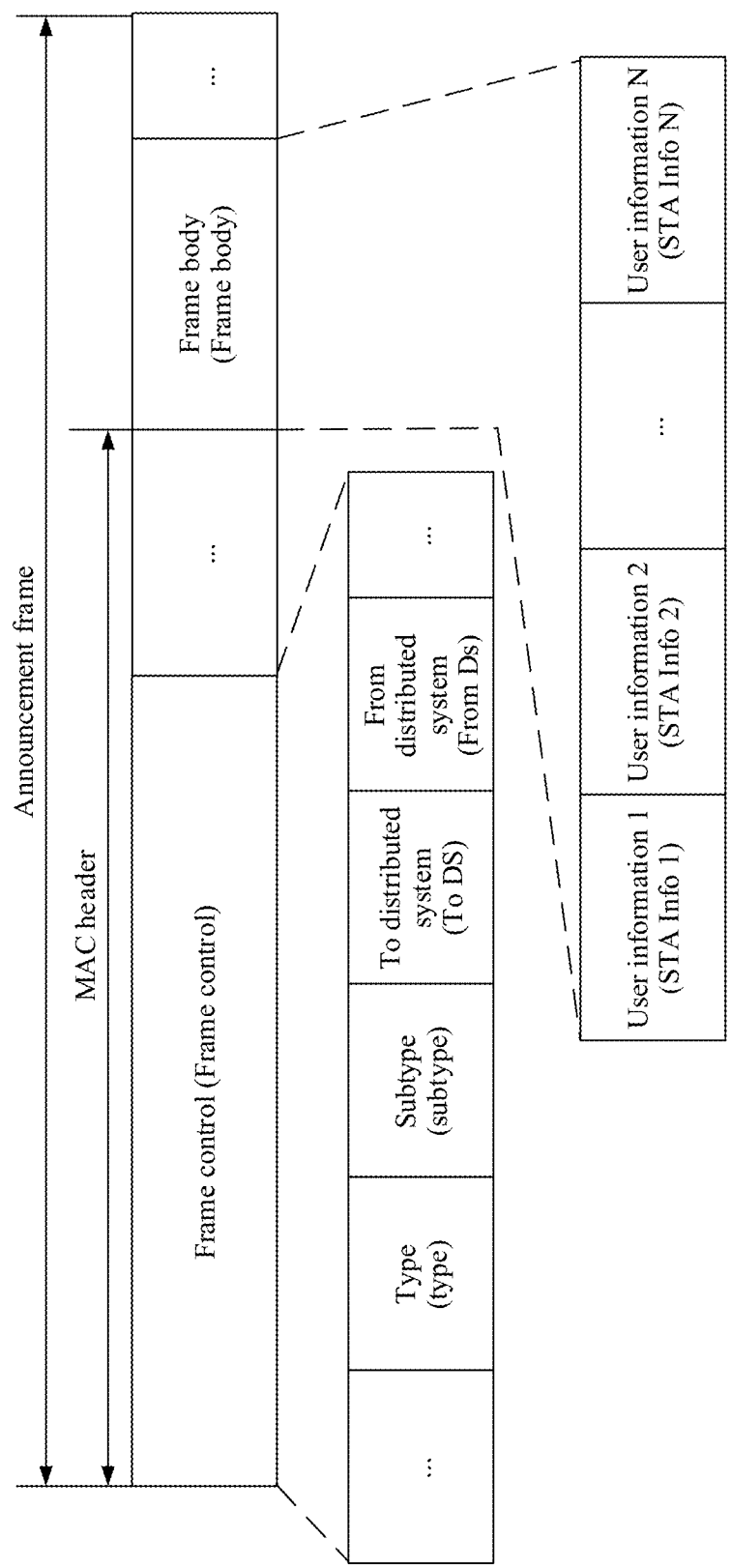
FIG. 10 is a schematic flowchart of another sensing method according to this application.

FIG. 10 shows an example of a structure of the announcement frame. The announcement frame may have a similar structure to an existing NDP announcement frame. However, this is not limited in this application.

As shown in FIG. 10, the announcement frame includes a MAC header and a frame body field. The MAC header may include a frame control domain. It should be understood that the announcement frame may further include another field. For the another field, refer to a structure of the existing NDP announcement frame.

The frame control domain in the media access control (MAC) header in a frame control field may include a type field and a subtype field. A value of the type field and a value of the subtype field jointly indicate the at least one second device to perform a sensing task.

Specifically, there is a mapping relationship between the value of the type field and a type of a frame, and whether the frame is specifically a control frame, a data frame, or a management frame may be determined based on the different values. In this application, the announcement frame is a control frame. A frame of each type further includes a plurality of subtypes that are used to define a specific function of the frame. A function of the control frame in this application is to indicate the at least one second device to perform the sensing task.

According to an existing protocol, a value of a type field in a frame is "01", indicating that the frame is a control frame. In this application, the value of the type field in the announcement frame may be "01". However, this is not limited in this application. In addition, in a conventional technology, the value of the type field is "01", and a subtype field has a plurality of values, corresponding to different subtypes. The value of the subtype field in the announcement frame in the application may be a value that is not used in the conventional technology, for example, a reserved value, for example, 0001. However, this is not limited in this application.

The frame body field may include a category field. A value of the category field indicates a type of the sensing signal used by the at least one second device to perform the sensing task.

For example, Table 1 shows a correspondence between the value of the category field and a meaning of the value.

TABLE 1

| Value of category field (Category value) | Meaning (Meaning) |
|---|---|
| 0 | Performing sensing by using the midamble (Sensing with midamble) |
| 1 to 255 | Reserved (Reserved) |

Refer to Table 1. When the value of the category field is 0, the announcement frame may indicate the at least one second device to perform the sensing task by using the midamble.

For example, Table 2 shows another correspondence between the value of the category field and the meaning of the value.

TABLE 2

| Value of category field (Category value) | Meaning (Meaning) |
|---|---|
| 0 | Performing sensing by using the midamble (Sensing with midamble) |
| 1 | Performing sensing by using the preamble |
| 2 | Performing sensing by using the pilot |
| 3 to 255 | Reserved (Reserved) |

Refer to Table 2. The value of the category field is 0, indicating that the at least one second device performs the sensing task by using the midamble, that is, the sensing signal used by the at least one second device to perform the sensing task is the midamble. The value of the category field is 1, indicating that the at least one second device performs the sensing task by using the preamble. The value of the category field is 2, indicating that the at least one second device performs the sensing task by using the pilot. It should be understood that a correspondence between a specific value and the type of the sensing signal is not limited in this application. This is merely an example for description, and should not constitute any limitation on this application.

In addition, the frame body field further includes a plurality of user information (STA Info) fields (such as STA Info 1, STA Info 2, ..., and STA Info N in FIG. 10). When the sensing parameter of the at least one second device includes a same parameter, the same part of the sensing parameter may be carried on a bit after a special ID in the STA Info 1 (specifically, a subsequent field in the STA info 1 may be used to carry the same of the sensing parameter when an AID in the STA info 1 is a special ID, for example, 2047). A different part of the sensing parameter is carried in the user information field corresponding to each second device when the sensing parameter of the at least one second device includes the different part.

For example, it is assumed that the at least one second device is a STA 1, a STA 2, ..., a STA N; a user information field corresponding to the STA 1 is STA Info 1, a user information field corresponding to the STA 2 is STA Info 2, ..., and a user information field corresponding to the STA N is STA Info N; and a sensing parameter that needs to be carried in the announcement frame for each second device is an A parameter, a B parameter, and a C parameter. If values of A parameters, B parameters, and C parameters of N second devices are the same, the A parameter, the B parameter, and the C parameter may be carried in a common information field. The A parameter, the B parameter, and the C parameter do not need to be carried in the STA Info 1, the A parameter, the B parameter, and the C parameter do not need to be carried in the STA Info 2 ..., and the A parameter, the B parameter, and the C parameter do not need to be carried in the STA Info N. If values of A parameters and B parameters of the N second devices are the same, and values of C parameters of the N second devices are different (values of C parameters of at least two of the N second devices are different), the A parameter and the B parameter may be carried in the common information field. A C parameter of the STA 1 is carried in the STA Info 1, a C parameter of the STA 2 is carried in the STA Info 2 ... and a C parameter of the STA N is carried in the STA Info N.

Optionally, a to distributed system (To DS) field and a from distributed system (From DS) field in the existing frame structure (for example, high efficiency (HE)/very high throughput (VHT) NDP Announcement) may be reused, to indicate the at least one second device to perform the sensing task. When values of the two fields both are "0", the announcement frame may indicate the at least one second device to perform the sensing task. Further, the value of the category field may indicate the first device configures the same sensing parameter for the at least one second device, or the first device configures a same part of the sensing parameter for the at least one second device, and the second device needs to set autonomously the remaining part of the sensing parameter.

2. Feedback Trigger Frame

Figure 11:
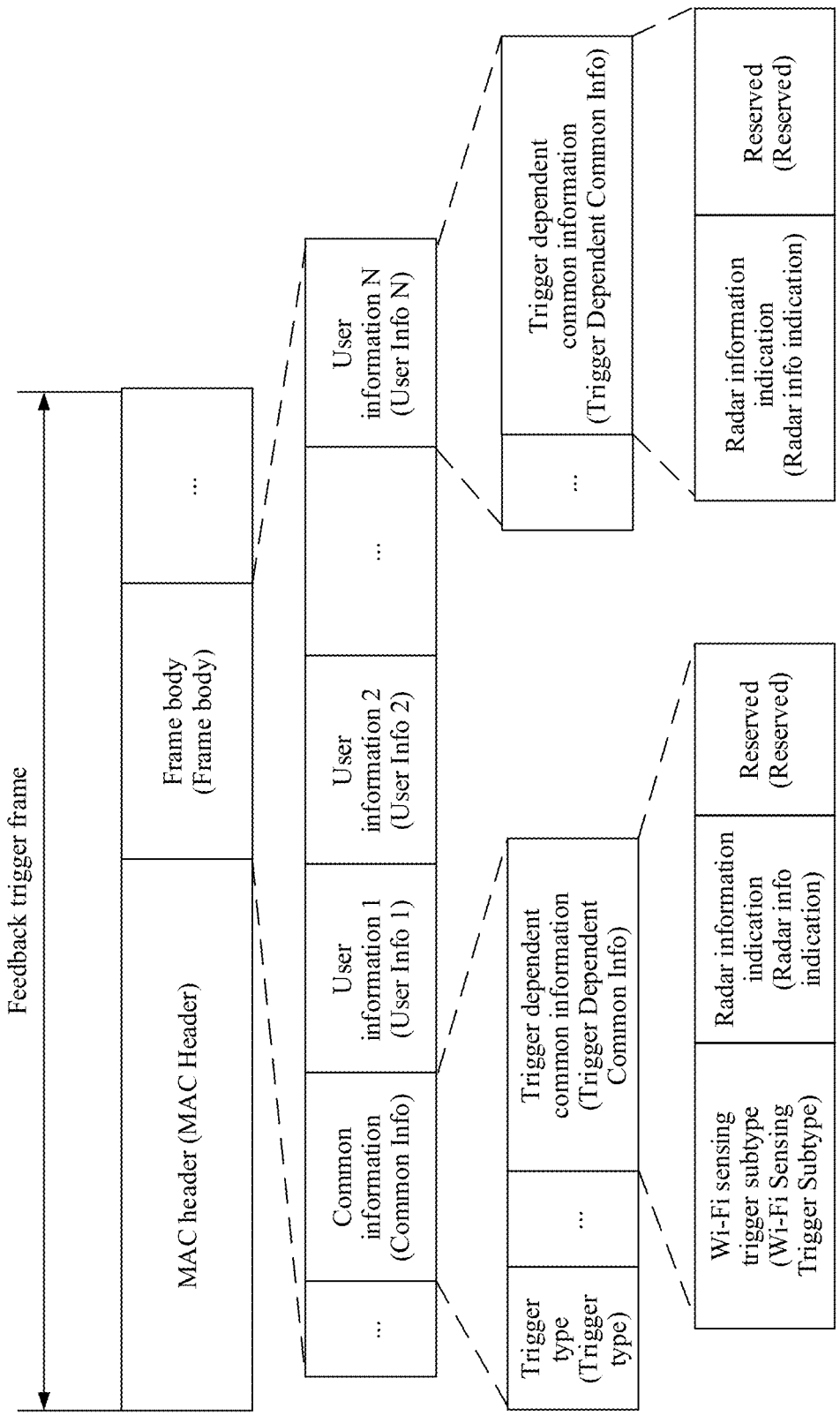
FIG. 11 is a schematic diagram of a structure of an announcement frame according to this application.

FIG. 11 is a schematic diagram of a structure of the feedback trigger frame.

Refer to FIG. 11. The feedback trigger frame includes a MAC header and a frame body field. The announcement frame may further include another field. For the another field, refer to a structure of an existing trigger frame. The frame body field may include a common information (Common Info) field and a user information field. The user information field is STA Info 1, STA Info 2, . . . , and STA Info N shown in FIG. 11.

The common information field may include a trigger type field and a trigger dependent common information (Trigger Dependent Common Info) field. The trigger dependent common information field may include a Wi-Fi sensing trigger subtype field, a radar information indication (Radar info indication) field, and a reserved field.

A value of the trigger type field: For example, the value of the trigger type field is 9, indicating that the feedback trigger frame is used by the second device to perform a sensing task, that is, the feedback trigger frame is a trigger frame used for a radar test. A value in the Wi-Fi sensing trigger subtype field: For example, the value of the Wi-Fi sensing trigger subtype field is a value in values reserved in the conventional technology, indicating that the second device feeds back a sensing result.

For example, Table 3 shows a correspondence between the value of the Wi-Fi sensing trigger subtype field and a meaning of the value.

TABLE 3

| Value of Wi-Fi sensing trigger subtype field | Meaning |
|---|---|
| 00 | Sensing feedback (Sensing Feedback) |
| 01 to 11 | Reserved (Reserved) |

Refer to Table 3. The value of the Wi-Fi sensing trigger subtype field is "00", indicating that a function of the trigger frame is to trigger the second device to perform sensing feedback, that is, trigger the second device to feed back the sensing result.

The radar information indication field may be used to indicate content included in the sensing result. For example, Table 4 shows a correspondence between the value of the radar information indication field and a meaning of the value.

TABLE 4

| Value of radar information indication field | Meaning |
|---|---|
| 00 | CSI |
| 01 | Final result (Final result) |
| 10 | Feeding back a signal processing result (Signal processing result) |
| 11 | Reserved (Reserved) |

Refer to Table 4. The value of the radar information indication field is "00", indicating that the feedback trigger frame triggers a device of a receive end (namely, a device that receives the feedback trigger frame, for example, the second device) to feed back the CSI. The value of the radar information indication field is "01", indicating that the feedback trigger frame triggers the receive end to feed back the final result. The value of the radar information indication field is "10", indicating that the feedback trigger frame triggers the receive end to feed back the signal processing result. The value of the radar information indication field is "11", indicating a reserved value. The final result corresponds to target detection. In other words, when the value of the radar information indication field is "01", the receive end needs to feed back information obtained by performing the target detection, for example, a speed, an angle, and a range. The signal processing result field corresponds to action and behavior recognition. In other words, when the value of the radar information indication field is "10", the receive end needs to feed back information obtained by performing the action and behavior recognition, for example, range-Doppler and/or time-Doppler.

It should be understood that the values and corresponding meanings shown in Table 4 are merely examples, and should not constitute any limitation on this application.

The user information field may include a trigger dependent common information (Trigger Dependent Common Info) field. The trigger dependent common information field may include a radar information indication (Radar info indication) field, and a reserved field. Content included in the radar information indication field in the user information field may be the same as content included in the radar information indication field in the common information field. If each receive end (for example, the at least one second device) needs to feed back same content, for example, feed back the signal processing result, the radar information indication field in the common information field may be set to a corresponding value, for example, "10" as shown in Table 4. If content fed back by each receive end needs to be separately indicated, the radar information indication field in the corresponding user information field may be set to a corresponding value. For example, if a user corresponding to STA Info 1 needs to feed back the signal processing result, a radar information indication field in the STA Info 1 field may be set to "10", and if the user corresponding to the STA Info 1 needs to feed back the final result, the radar information indication field in a STA Info 2 field may be set to "01".

3. Sensing Data Frame

Figure 12:
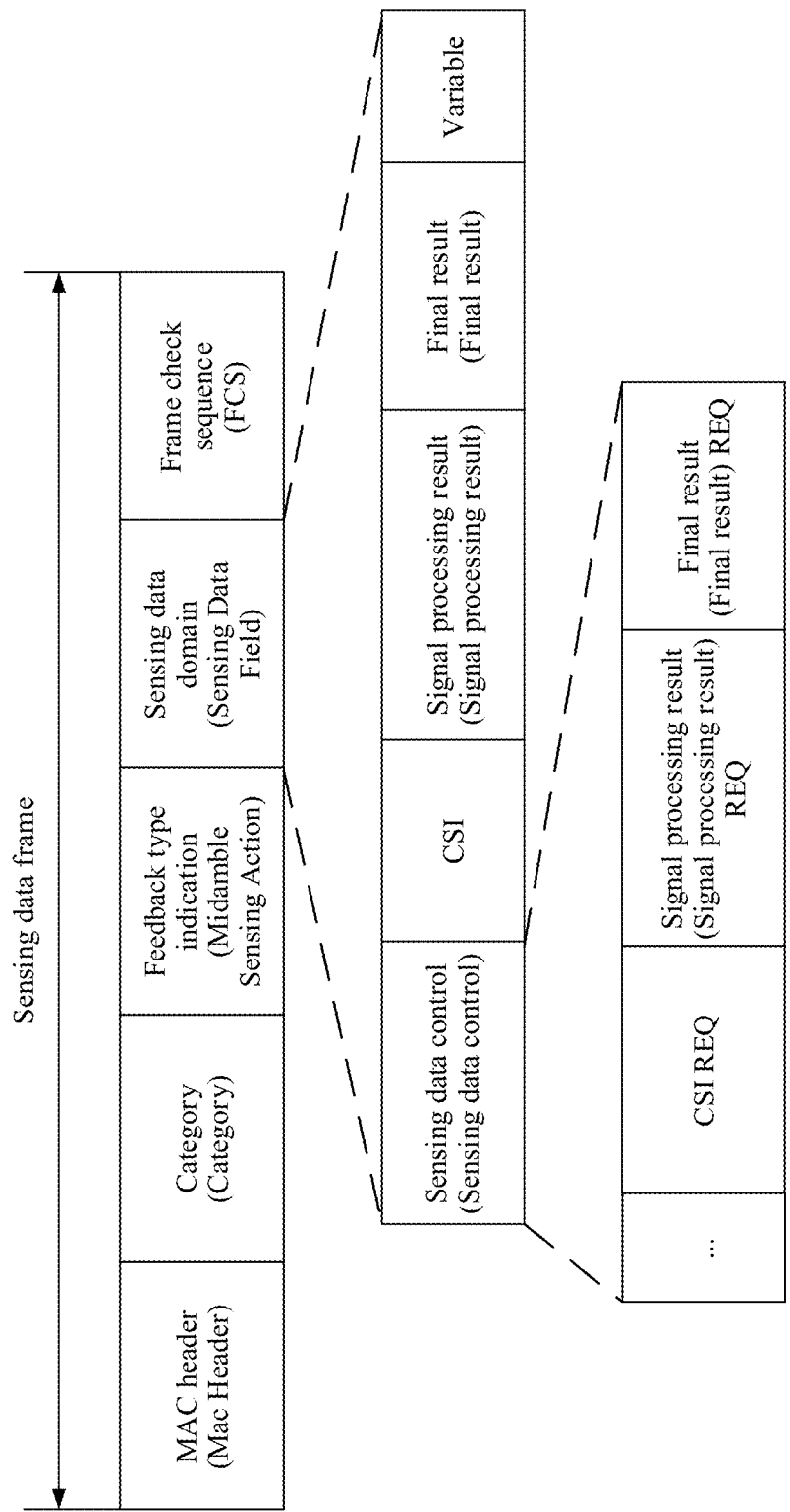
FIG. 12 is a schematic diagram of a structure of a feedback trigger frame according to this application.

FIG. 12 is a schematic diagram of a structure of the sensing data frame. It should be understood that the sensing data frame shown in FIG. 12 is a data frame.

Refer to FIG. 12. The sensing data frame includes a category field. A value of the category field may indicate that a sensing result in the sensing data frame is obtained by using a midamble. Optionally, one value, for example, 31, may be selected from reserved values of the category field to indicate that the sensing result in the sensing data frame is obtained by using the midamble.

The sensing data frame may further include a feedback type indication (namely, a midamble sensing action in FIG. 12) field, and the feedback type indication field is used to indicate that the sensing result is sensing data. For example, a value of the feedback type indication is 0, indicating that the sensing result is the sensing data.

The sensing data frame may further include a sensing data domain (Sensing Data Field). The sensing data domain includes a sensing data control field and a sensing data field. The sensing data control field is used to indicate a type of data fed back by the second device. The sensing data field carries the data fed back by the second device. The sensing result includes the data fed back by the second device.

For example, refer to FIG. 12. The sensing data control field may include a channel state information (CSI) request (REQ) field, a signal processing result REQ field, and a final result REQ field. A value of the CSI REQ field is used to indicate whether the second device feeds back CSI. A value of the signal processing result REQ field is used to indicate whether the second device feeds back a signal processing result. A value of the final result REQ field is used to indicate whether the second device feeds back a final result. In other words, the type of the data fed back by the second device includes one or more of the CSI, the signal processing result, and the final result. For example, the CSI REQ field is 1, indicating that the type of the data fed back by the second device includes the CSI; or the CSI REQ field is 0, indicating that the type of the data fed back by the second device does not include the CSI. The signal processing result REQ field is 1, indicating that the type of the data fed back by the second device includes the signal processing result; or the signal processing result REQ field is 0), indicating that the type of the data fed back by the second device does not include the signal processing result. The final result REQ field is 1, indicating that the type of the data fed back by the second device includes the final result; or the final result REQ field is 0, indicating that the type of the data fed back by the second device does not include the final result. It should be understood that the meanings of the foregoing values of 0 and 1 may be exchanged.

In a manner, the sensing data field may include the CSI field, a signal processing result field, and a final result field shown in FIG. 12. If the second device feeds back the CSI, the CSI fed back by the second device is carried in the CSI field, and if the second device does not feed back the CSI, the CSI field is set to a default value. Similarly, if the second device feeds back the signal processing result, the signal processing result fed back by the second device is carried in the signal processing result, and if the second device does not feed back the signal processing result, the signal processing result field is set to a default value. If the second device feeds back the final result, the final result fed back by the second device is carried in the final result, and if the second device does not feed back the final result, the final result field is set to a default value.

In another manner, the sensing data field may include only data of a corresponding type fed back by the second device. For example, if the sensing data control field only indicates the second device to feed back the final result, the sensing data field may include only the final result field, but does not include the CSI field and the signal processing result field.

For example, the signal processing result REQ field and the signal processing result field may correspond to action and behavior recognition, that is, the signal processing result is data obtained by the second device performing the action and behavior recognition, for example, range-Doppler and/or time-Doppler. The final result REQ field and the final result field may correspond to target detection, that is, the final result is data obtained by the second device performing the target detection, for example, a speed, an angle, and a range.

It should be understood that a quantity of bits occupied by the foregoing fields or domains is not limited in this application.

The foregoing describes the sensing method provided in this application. The following describes another sensing method provided in this application.

Figure 13:
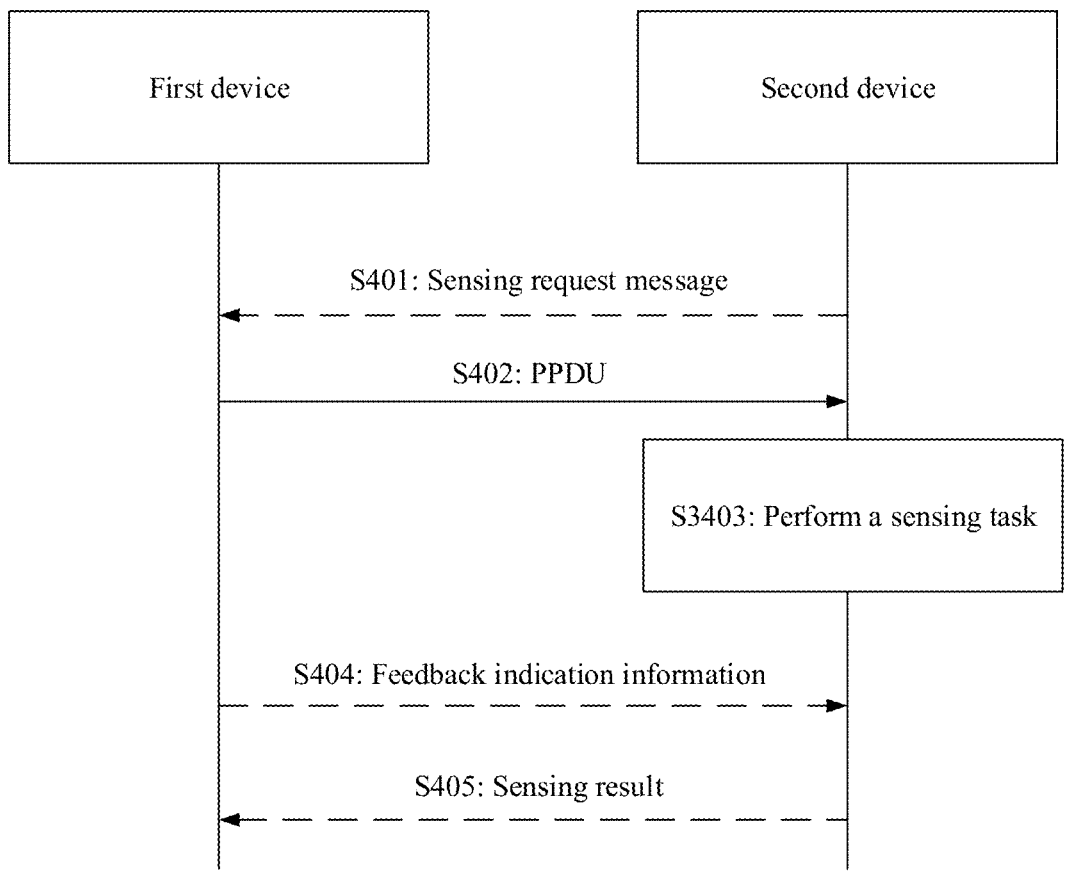
FIG. 13 is a schematic diagram of a structure of a sensing data frame according to this application.

FIG. 13 is a schematic diagram of another sensing method according to this application. As shown in FIG. 13, the method 400 may include S402 and S403. Optionally, the method 400 may further include one or more steps of S401, S404, and S405. The steps shown in FIG. 7 are described below.

S401: A second device sends a sensing request message to a first device. Correspondingly, the first device receives the sensing request message.

For this step, refer to S301. Details are not described herein again. In addition, S401 is the same as S301, and both are optional steps.

S402: The first device sends a PPDU to at least one second device. Correspondingly, the second device receives the PPDU sent by the first device.

Similar to that in S302, the PPDU in S402 may be sent based on S401, or not based on S401.

First, the PPDU is used to indicate the at least one second device to perform a sensing task by using a sensing signal. After receiving the PPDU, the second device may determine that the second device needs to perform the sensing task by using the sensing signal. Optionally, the PPDU may further indicate a type of the sensing signal. To be specific, the PPDU may indicate the at least one second device to perform the sensing task by using a sensing signal. For example, the sensing signal may be a midamble, a pilot, or a preamble. It should be noted that the PPDU may not indicate the type of the sensing signal. In this case, the type of the sensing signal may be specified in a protocol, or may be negotiated by the first device and the at least one second device in advance.

Secondly, the PPDU is further used to indicate a sensing parameter required by the at least one second device to perform the sensing task. A manner in which the PPDU indicates the sensing parameter required by the at least one second device to perform the sensing task is similar to a manner in which the announcement frame indicates the sensing parameter required by the at least one second device to perform the sensing task in S302. For details, refer to the foregoing description. Details are not described herein again.

Optionally, a physical layer header (PHY Header) of the PPDU may indicate the at least one second device to perform the sensing task by using the midamble, and to indicate the sensing parameter required by the at least one second device to perform the sensing task.

For example, an existing SIG A may be reused. For example, some bits such as B14 in an HE-SIG A indicate the at least one second device to perform the sensing task by using the midamble. For example, B14 is 1, indicating the at least one second device to perform the sensing task by using the midamble.

For another example, the existing SIG A may be reused. For example, some bits such as B18 to B15 in the HE-SIG A indicate the sensing parameter required by the at least one second device to perform the sensing task. For example, the PPDU configures only the CPI, and predefines a correspondence between values of B18 to B15 and values of the CPI, and another parameter in the sensing parameter may be autonomously configured by the second device. In this case, the second device may determine a CPI length based on the values of B18 to B15 in the PPDU and the predefined correspondence between the values of B18 to B15 and the values of the CPI.

Thirdly, the PPDU includes the sensing signal.

For ease of understanding, the following mainly uses an example in which the sensing signal is a midamble for description. It should be understood that one PPDU may include one or more midambles.

It should be understood that a quantity of the midambles in one PPDU may be less than the CPI. In this case, S402 is repeatedly performed. Specifically, after the first device sends the PPDU, the second device may perform signal processing, for example, multipath cancellation and matched filtering on the midamble in the PPDU, and perform accumulation based on the CPI length. Then, the first device sends the PPDU again, and the second device may perform signal processing, for example, multipath cancellation and matched filtering on the midamble in the PPDU, and perform accumulation based on the CPI length. This process is repeated until the second device completes the accumulation, and may feed back the sensing result.

S403 and S404: The first device sends feedback indication information to the at least one second device, and the second device feeds back the sensing result after receiving the feedback indication information.

For S403 and S404, refer to the foregoing descriptions of S305 and S306. Details are not described herein again.

In the method provided in this application, based on an indication of the first device, the second device may perform the sensing task by using the sensing signal in the PPDU sent by the first device and the sensing parameter, to implement radar detection by using a Wi-Fi signal. In addition, the PPDU usually carries the sensing signal. In this way, radar detection can be implemented without a separate design of a detection process. This can reduce implementation complexity.

Further, the sensing signal may be the midamble. A midamble signal has a simple sequence and a fixed period. Therefore, this can reduce sensing complexity and improve sensing efficiency. In addition, sensing precision can be improved because the midamble is sent on full bandwidth.

The foregoing describes the method provided in this application. The following describes an apparatus provided in this application.

Figure 14:
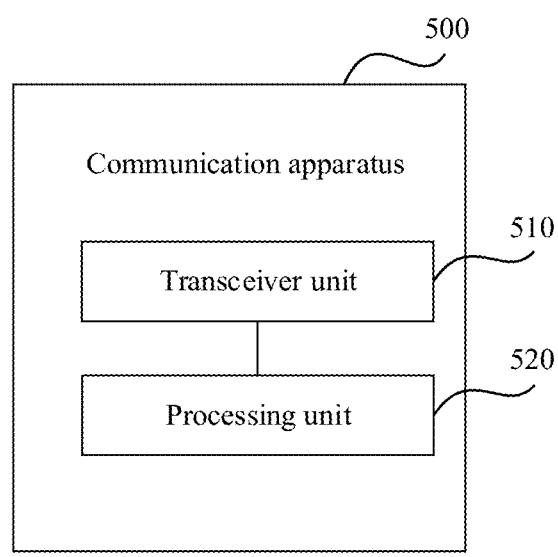
FIG. 14 is a schematic block diagram of a communication apparatus according to an embodiment of this application.

FIG. 14 is a schematic block diagram of a communication apparatus according to an embodiment of this application. As shown in FIG. 14, the communication apparatus 800 may include a transceiver unit 510 and a processing unit 520.

The transceiver unit 510 may include a sending unit and/or a receiving unit. The transceiver unit 510 may be a transceiver (including a transmitter and/or a receiver), an input/output interface (including an input interface and/or an output interface), a pin, a circuit, or the like. The transceiver unit 510 may be configured to perform the sending and/or receiving steps in the foregoing method embodiments.

The processing unit 520 may be a processor (which may include one or more processors), a processing circuit having a processor function, or the like, and may be configured to perform another step other than sending and receiving in the foregoing method embodiments.

Optionally, the communication apparatus may further include a storage unit. The storage unit may be a memory, an internal storage unit (for example, a register or a cache), an external storage unit (for example, a read-only memory or a random-access memory), or the like. The storage unit is configured to store instructions, and the processing unit 520 may execute the instructions stored in the storage unit, so that the communication apparatus performs the foregoing methods.

In a possible design, the communication apparatus 500 may correspond to the first device in the foregoing method embodiments, and may perform operations performed by the first device in the foregoing methods.

In an example, the processing unit 520 may be configured to generate the announcement frame and the PPDU described in the method 300, and the transceiver unit 510 is configured to send the announcement frame and the PPDU.

In another example, the processing unit 520 is configured to generate the PPDU described in the method 400, and the transceiver unit 510 is configured to send the PPDU.

In another possible design, the communication apparatus 500 may correspond to the second device in the foregoing method embodiments, and may perform operations performed by the second device in the foregoing methods.

In an example, the transceiver unit 510 may be configured to receive the announcement frame and the PPDU described in the method 300, and the processing unit 520 is configured to perform a sensing task based on the announcement frame and the PPDU.

In another example, the transceiver unit 510 may be configured to receive the PPDU described in the method 400, and the processing unit 520 is configured to perform the sensing task based on the PPDU.

It should be understood that division of the foregoing units is merely function division, and there may be another division method during actual implementation.

It should be further understood that the processing unit may be implemented by using hardware, may be implemented by using software, or may be implemented by using a combination of software and hardware.

Figure 15:
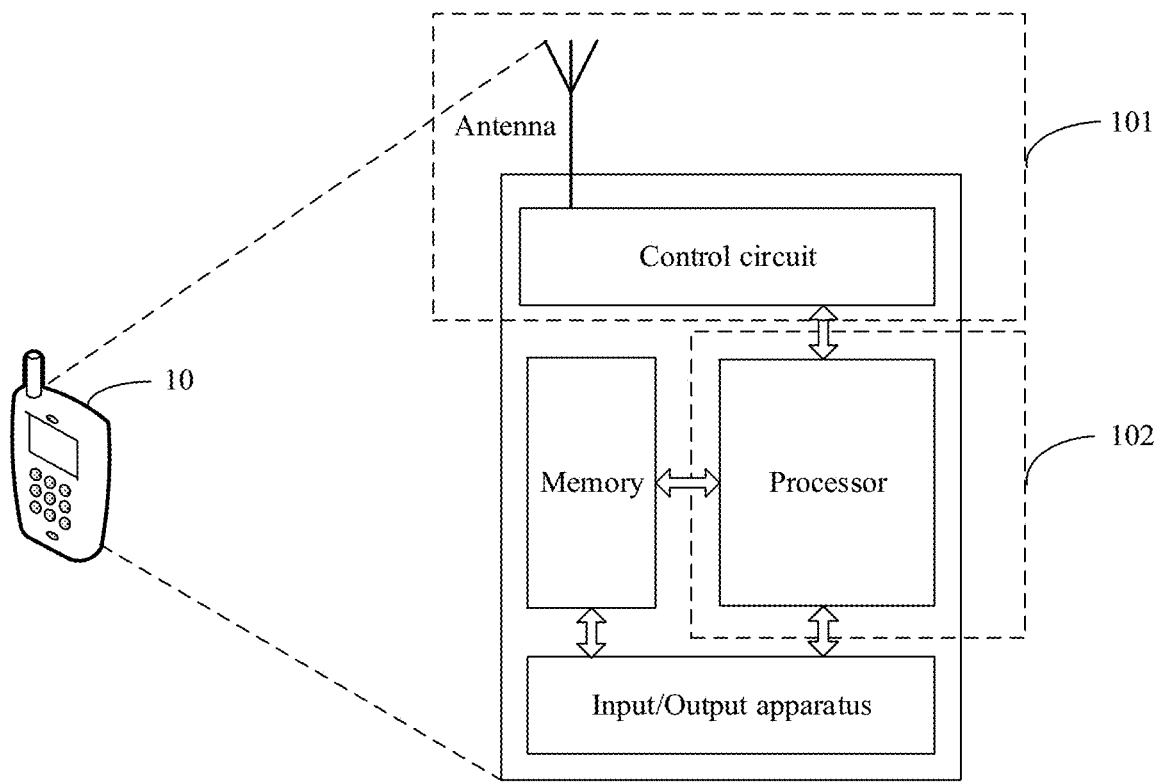
FIG. 15 is a schematic block diagram of a STA according to an embodiment of this application.

FIG. 15 is a schematic diagram of a structure of a STA 10 according to this application. For ease of description, FIG. 15 shows only main components of the STA. As shown in FIG. 15, the STA 10 includes a processor, a memory, a control circuit, an antenna, and an input/output apparatus.

The processor is mainly configured to: process a communication protocol and communication data, control an entire STA, execute a software program, and process data of the software program, for example, configured to support the STA in performing operations performed by the first device (or the second device) described in the foregoing method embodiments. The memory is mainly configured to store the software program and data. The control circuit is mainly configured to: perform conversion between a baseband signal and a radio frequency signal, and process the radio frequency signal. A combination of the control circuit and the antenna may also be referred to as a transceiver, and are mainly configured to send and receive a radio frequency signal in a form of an electromagnetic wave. The input/output apparatus, such as a touchscreen, a display, or a keyboard, is mainly configured to receive data input by a user and output data to the user.

After the STA is powered on, the processor may read a software program in a storage unit, explain and execute instructions of the software program, and process data of the software program. When data needs to be sent in a wireless manner, after performing baseband processing on the to-be-sent data, the processor outputs a baseband signal to a radio frequency circuit. After performing radio frequency processing on the baseband signal, the radio frequency circuit sends a radio frequency signal through an antenna in a form of an electromagnetic wave. When data is sent to the STA, the radio frequency circuit receives a radio frequency signal through the antenna, converts the radio frequency signal into a baseband signal, and outputs the baseband signal to the processor. The processor converts the baseband signal into data, and processes the data.

A person skilled in the art may understand that for ease of description, FIG. 15 shows only one memory and one processor. There may be a plurality of processors and memories in an actual STA. The memory may also be referred to as a storage medium, a storage device, or the like. This is not limited in this embodiment of this application.

In an optional implementation, the processor may include a baseband processor and a central processing unit. The baseband processor is mainly configured to process the communication protocol and the communication data. The central processing unit is mainly configured to: control the entire STA, execute the software program, and process the data of the software program. Functions of the baseband processor and the central processing unit are integrated into the processor in FIG. 15. A person skilled in the art may understand that the baseband processor and the central processing unit may be independent processors, and are interconnected by using a technology such as a bus. A person skilled in the art may understand that the STA may include a plurality of baseband processors to adapt to different network standards, and the STA may include a plurality of central processing units to enhance a processing capability of the STA. The components of the STA may be connected by using various buses. The baseband processor may also be expressed as a baseband processing circuit or a baseband processing chip. The central processing unit may also be expressed as a central processing circuit or a central processing chip. A function of processing the communication protocol and communication data may be embedded into the processor, or may be stored in the storage unit in a form of a software program, so that the processor executes the software program to implement a baseband processing function.

For example, in this embodiment of this application, the control circuit and the antenna that has a transceiver function may be considered as a transceiver unit 101 of the STA 10, and the processor having a processing function may be considered as a processing unit 102 of the STA 10. The STA 10 includes the transceiver unit 101 and the processing unit 102 as shown in FIG. 15. The transceiver unit may also be referred to as a transceiver, a transceiver machine, a transceiver apparatus, or the like. Optionally, a component that is in the transceiver unit 101 and that is configured to implement a receiving function may be considered as a receiving unit, and a component that is in the transceiver unit 101 and that is configured to implement a sending function may be considered as a sending unit. In other words, the transceiver unit 101 includes the receiving unit and the sending unit. For example, the receiving unit may also be referred to as a receiving machine, a receiver, a receiving circuit, or the like; and the sending unit may be referred to as a transmitting machine, a transmitter, a transmitting circuit, or the like.

The STA shown in FIG. 15 may perform actions performed by the first device (or the second device) in the foregoing methods. To avoid repetition, detailed description of the STA is omitted herein.

Figure 16:
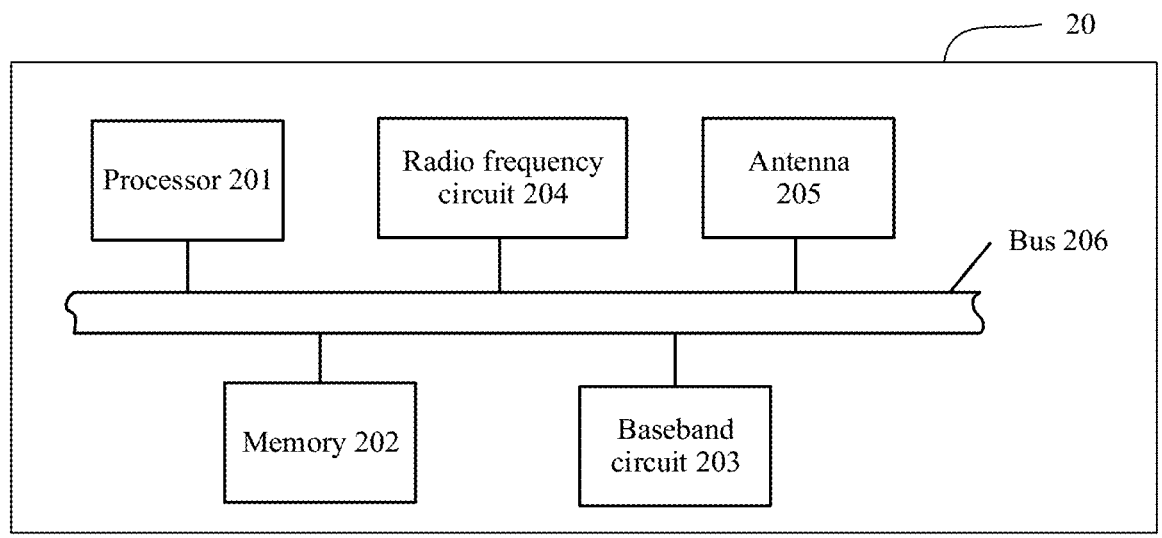
FIG. 16 is a schematic block diagram of an AP according to an embodiment of this application.

FIG. 16 is a schematic diagram AP of a structure of an AP according to this application. As shown in FIG. 16, the AP may be applied to the communication system shown in FIG. 2, to perform functions of the second device (or the first device) in the foregoing method embodiments.

The AP 20 may include a processor 201. The processor 201 may also be referred to as a processing unit, and may implement a specific control function. The processor 201 may be a general-purpose processor, a dedicated processor, or the like. The processor 201 may be configured to: control the AP, execute a software program, and process data of the software program.

In an optional design, the processor 201 may further store instructions and/or data. The instructions and/or data may be run by the processor 201, so that the AP 20 performs the methods described in the foregoing method embodiments.

Optionally, the AP 20 may include a memory 202. The memory 202 may store instructions. The instructions may be run on the processor, so that the AP 20 performs the methods described in the foregoing method embodiments. Optionally, the memory may further store data. Optionally, the processor may also store instructions and/or data. The processor and the memory may be disposed separately, or may be integrated. For example, the correspondences described in the foregoing method embodiments may be stored in the memory or stored in the processor.

Optionally, the AP 20 may include a baseband circuit 203, mainly configured to perform baseband processing.

Optionally, the AP 20 may include a radio frequency circuit 204. The radio frequency circuit 204 is mainly configured to: send and receive a radio frequency signal, and perform conversion between a baseband signal and a radio frequency signal, for example, configured to send the PPDU in the foregoing method embodiments. The radio frequency circuit 204 may also be referred to as a transceiver unit, a transceiver machine, a transceiver circuit, a transceiver, or the like.

Optionally, the AP 20 may include an antenna 205, mainly configured to send and receive a signal.

Optionally, the AP 20 may include a bus 206, configured to connect parts of the AP 20, such as the processor 201, the memory 202, the baseband circuit 203, the radio frequency circuit 204, and the antenna 205.

It should be noted that, the processor in the embodiments of this application may be an integrated circuit chip, and has a signal processing capability. In an implementation process, the steps in the foregoing method embodiments may be completed by using a hardware integrated logic circuit in the processor or instructions in a form of software. The foregoing processor may be a general-purpose processor, a digital signal processor (DSP), an application-specific integrated circuit (ASIC), a field programmable gate array (FPGA) or another programmable logic device, a discrete gate or transistor logic device, or a discrete hardware component. The processor may implement or perform the methods, the steps, and logical block diagrams that are disclosed in the embodiments of this application. The general-purpose processor may be a microprocessor, or the processor may be any conventional processor, or the like. The steps in the methods disclosed with reference to the embodiments of this application may be directly executed and accomplished by using a hardware decoding processor, or may be executed and accomplished by using a combination of hardware and software modules in a decoding processor. A software module may be located in a mature storage medium in the art, such as a random-access memory, a flash memory, a read-only memory, a programmable read-only memory, an electrically erasable programmable memory, or a register. The storage medium is located in the memory, and the processor reads information in the memory and completes the steps of the foregoing methods in combination with hardware of the processor.

It may be understood that the memory in the embodiments of this application may be a volatile memory or a non-volatile memory; or may include both a volatile memory and a non-volatile memory. The non-volatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random-access memory (RAM) that is used as an external buffer. By way of example but not restrictive description, many forms of RAMs are available, for example, a static random-access memory (static RAM, SRAM), a dynamic random-access memory (dynamic RAM, DRAM), a synchronous dynamic random-access memory (synchronous DRAM, SDRAM), a double data rate synchronous dynamic random-access memory (double data rate SDRAM, DDR SDRAM), an enhanced synchronous dynamic random-access memory (enhanced SDRAM, ESDRAM), a synchlink dynamic random-access memory (synchlink DRAM, SLDRAM), and a direct rambus random-access memory (direct rambus RAM, DR RAM). It should be noted that the memory in the system and method described in this specification includes but is not limited to these memories and any memory of another proper type.

This application further provides a computer-readable medium. The computer-readable medium stores a computer program. When the computer program is executed by a computer, functions of any one of the foregoing method embodiments are implemented.

This application further provides a computer program product. When the computer program product is executed by a computer, functions of any one of the foregoing method embodiments are implemented.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer instructions are loaded and executed on a computer, the procedures or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a high-dense digital video disc (DVD)), a semiconductor medium (for example, a solid-state drive (solid-state disk, SSD)), or the like.

It should be understood that "an embodiment" mentioned in the entire specification means that particular features, structures, or characteristics related to the embodiment are included in at least one embodiment of this application. Therefore, the embodiments in the entire specification are not necessarily same embodiments. In addition, these particular features, structures, or characteristics may be combined in one or more embodiments in any appropriate manner. It should be understood that sequence numbers of the foregoing processes do not mean execution orders in various embodiments of this application. The execution orders of the processes should be determined based on functions and internal logic of the processes, and should not be construed as any limitation on the implementation processes of the embodiments of this application.

It should be further understood that, in this application, "when" and "if" mean that UE or a base station performs corresponding processing in an objective situation, and are not intended to limit time, and the UE or the base station is not necessarily required to have a determining action during implementation, and do not mean any other limitation.

In addition, the terms "system" and "network" may be used interchangeably in this specification. The term "and/or" in this specification describes only an association relationship for associated objects and represents that three relationships may exist. For example, A and/or B may represent the following three cases: Only A exists, both A and B exist, and only B exists.

The term "at least one of . . . " in this specification represents all or any combination of the listed items. For example, "at least one of A, B, and C" may represent the following six cases: A exists alone, B exists alone, C exists alone, A and B coexist, B and C coexist, and A, B, and C coexist.

It should be understood that in the embodiments of this application, "B corresponding to A" indicates that B is associated with A, and B may be determined based on A. However, it should further be understood that determining B based on A does not mean that B is determined based on A only; that is, B may also be determined based on A and/or other information.

In this application, "at least one" represents one or more, and "a plurality of" represents two or more.

A person of ordinary skill in the art may be aware that units and algorithm steps in the examples described with reference to the embodiments disclosed in this specification can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

A person skilled in the art may clearly understand that, for the purpose of convenient and brief description, for detailed working processes of the described system, apparatus, and unit, refer to corresponding processes in the foregoing method embodiments. Details are not described herein again.

In the several embodiments provided in this application, it should be understood that the disclosed system, apparatus, and method may be implemented in another manner. For example, the described apparatus embodiments are merely examples. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on an actual requirement to achieve the objectives of the solutions in the embodiments.

In addition, functional units in the embodiments of this application may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of this application essentially, or a part contributing to the conventional technology, or a part of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory (ROM), a random-access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A sensing method comprising:
    sending, by a first device, an announcement frame to at least one second device,
        wherein the announcement frame indicates to the at least one second device to perform a sensing task by using a midamble, and indicates a sensing parameter required by the at least one second device to perform the sensing task,
        wherein the announcement frame comprises a sensing task type field that indicates a type of the sensing task comprising a target detection and action and behavior recognition,
        wherein the target detection is used to determine at least one of a speed, a position, an angle, and a range of a target, and
        wherein the action and behavior recognition is used to recognize an action or a behavior of the target; and
    sending, by the first device, a physical layer protocol data unit to the at least one second device, wherein the physical layer protocol data unit comprises the midamble.

2. A sensing method comprising:
    receiving, by at least one second device, an announcement frame sent by a first device,
        wherein the announcement frame indicates to the at least one second device to perform a sensing task by using a midamble, and indicates a sensing parameter required by the at least one second device to perform the sensing task,
        wherein the announcement frame comprises a sensing task type field that indicates a type of the sensing task comprising a target detection and action and behavior recognition,
        wherein the target detection is used to determine at least one of a speed, a position, an angle, and a range of a target, and
        wherein the action and behavior recognition is used to recognize an action or a behavior of the target:
    receiving, by the at least one second device, a physical layer protocol data unit sent by the first device, wherein the physical layer protocol data unit comprises the midamble; and
    performing, by the second device, the sensing task based on the announcement frame and the physical layer protocol data unit.

3. The method according to claim 1, wherein the announcement frame further comprises a type field and a subtype field, and a value of the type field and a value of the subtype field jointly indicate the at least one second device to perform the sensing task.

4. The method according to claim 1, wherein the announcement frame further comprises a category field, and a value of the category field in the announcement frame indicates the at least one second device to perform the sensing task by using the midamble.

5. The method according to claim 1, further comprising:
    sending, by the first device, feedback indication information to the at least one second device, wherein the feedback indication information indicates the at least one second device to feed back a sensing result obtained by performing the sensing task; and
    receiving, by the first device, a sensing data frame reported by the at least one second device, wherein the sensing data frame comprises the sensing result.

6. The method according to claim 2, further comprising:
    receiving, by the second device, feedback indication information sent by the first device, wherein the feedback indication information indicates the second device to feed back a sensing result obtained by performing the sensing task; and
    reporting, by the second device, a sensing data frame to the first device, wherein the sensing data frame comprises the sensing result.

7. The method according to claim 5, wherein the sensing data frame comprises a category field that indicates that the sensing result is obtained by using the midamble.

8. The method according to claim 5, wherein the sensing data frame comprises a feedback type indication field that indicates that the sensing result is sensing data.

9. The method according to claim 5, wherein the sensing data frame comprises a sensing data domain that comprises a sensing data control field and a sensing data field,
    wherein the sensing data control field indicates a type of data fed back by the second device, the sensing data field carries the data fed back by the second device, and the sensing result comprises the data fed back by the second device.

10. A communication apparatus comprising:
    a transceiver; and
    a processor coupled to the transceiver, wherein
    the transceiver is configured to cooperate with the processor to send an announcement frame to at least one second device,
        wherein the announcement frame indicates the at least one second device to perform a sensing task by using a midamble, and indicates a sensing parameter required by the at least one second device to perform the sensing task, wherein the announcement frame comprises a sensing task type field that indicates a type of the sensing task comprising a target detection and action and behavior recognition, wherein the target detection is used to determine at least one of a speed, a position, an angle, and a range of a target, and wherein the action and behavior recognition is used to recognize an action or a behavior of the target; and the transceiver is further configured to cooperate with the processor to send a physical layer protocol data unit to the at least one second device, wherein the physical layer protocol data unit comprises the midamble.

11. The communication apparatus according to claim 10, wherein the announcement frame further comprises a type field and a subtype field, and wherein a value of the type field and a value of the subtype field jointly indicate the at least one second device to perform the sensing task.

12. The communication apparatus according to claim 11, wherein the announcement frame further comprises a category field, and wherein a value of the category field in the announcement frame indicates the at least one second device to perform the sensing task by using the midamble.

13. The communication apparatus according to claim 10, wherein the transceiver is further configured to cooperate with the processor to:
send feedback indication information to the at least one second device, wherein the feedback indication information indicates the at least one second device to feed back a sensing result obtained by performing the sensing task; and
receive a sensing data frame reported by the at least one second device, wherein the sensing data frame comprises the sensing result.

14. The communication apparatus according to claim 13, wherein the sensing data frame comprises a category field that indicates that the sensing result is obtained by using the midamble.

15. The communication apparatus according to claim 13, wherein the sensing data frame comprises a feedback type indication field that indicates that the sensing result is sensing data.

16. The communication apparatus according to claim 13, wherein the sensing data frame comprises a sensing data domain which comprises a sensing data control field and a sensing data field,
wherein the sensing data control field indicates a type of data fed back by the second device, the sensing data field carries the data fed back by the second device, and the sensing result comprises the data fed back by the second device.

17. The method according to claim 2, wherein the announcement frame further comprises
a type field and a subtype field, wherein a value of the type field and a value of the subtype field jointly indicate the at least one second device to perform the sensing task, or
a category field, wherein a value of the category field in the announcement frame indicates the at least one second device to perform the sensing task by using the midamble.

18. The method according to claim 6, wherein the sensing data frame comprises a category field that indicates that the sensing result is obtained by using the midamble.

19. The method according to claim 6, wherein the sensing data frame comprises a feedback type indication field that indicates that the sensing result is sensing data.

20. The method according to claim 6, wherein the sensing data frame comprises a sensing data domain that comprises a sensing data control field and a sensing data field,
wherein the sensing data control field indicates a type of data fed back by the second device, the sensing data field carries the data fed back by the second device, and the sensing result comprises the data fed back by the second device.

* * * * *

UNITED STATES PATENT AND TRADEMARK OFFICE
CERTIFICATE OF CORRECTION

| | | |
|---|---|---|
| PATENT NO. | : 12,231,994 B2 | Page 1 of 1 |
| APPLICATION NO. | : 17/665809 | |
| DATED | : February 18, 2025 | |
| INVENTOR(S) | : Du et al. | |

It is certified that error appears in the above-identified patent and that said Letters Patent is hereby corrected as shown below:

In the Claims

Claim 2: Column 30, Line 5: "recognize an action or a behavior of the target:" should read as -- recognize an action or a behavior of the target; --.

Signed and Sealed this
Eleventh Day of November, 2025

John A. Squires
*Director of the United States Patent and Trademark Office*